March 22, 1960  E. R. CHILD  2,929,553
AUTOMATIC AIRCRAFT NAVIGATOR
Filed Feb. 4, 1955  13 Sheets-Sheet 1
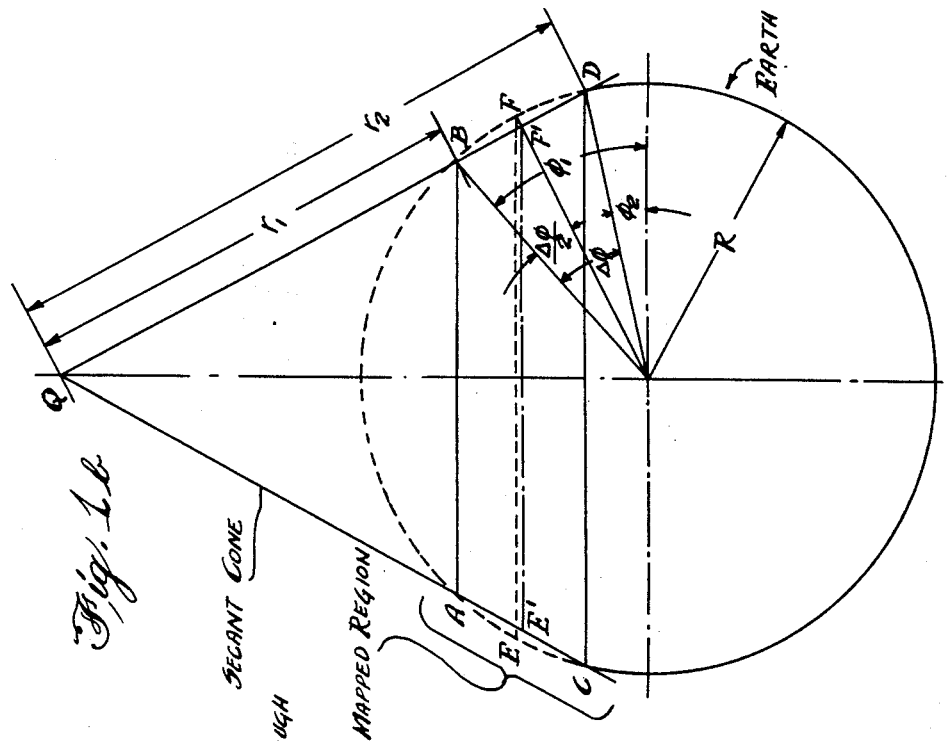
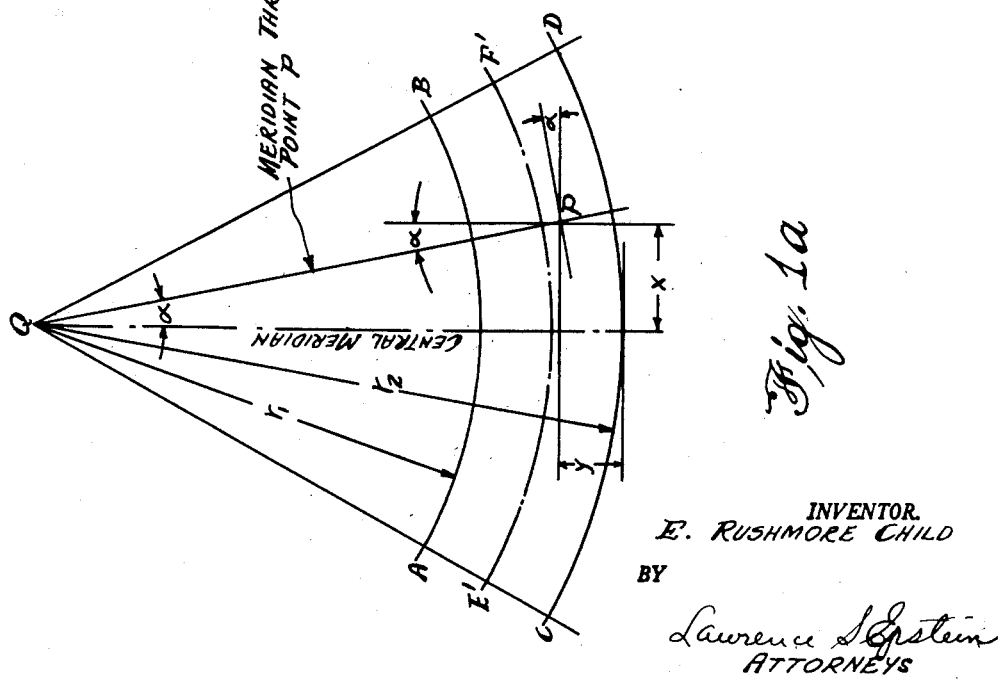
INVENTOR.
E. RUSHMORE CHILD
BY
Lawrence S. Epstein
ATTORNEYS March 22, 1960  E. R. CHILD  2,929,553
AUTOMATIC AIRCRAFT NAVIGATOR
Filed Feb. 4, 1955  13 Sheets-Sheet 2

INVENTOR.
E. RUSHMORE CHILD
BY
Lawrence S. Epstein
ATTORNEYS

March 22, 1960 E. R. CHILD 2,929,553
AUTOMATIC AIRCRAFT NAVIGATOR
Filed Feb. 4, 1955 13 Sheets-Sheet 3

RESOLUTION OF TRUE AIRSPEED VECTOR
INTO COMPONENTS PARALLEL TO OX & OY

INVENTOR.
E. RUSHMORE CHILD
BY
Lawrence S. Epstein
ATTORNEYS

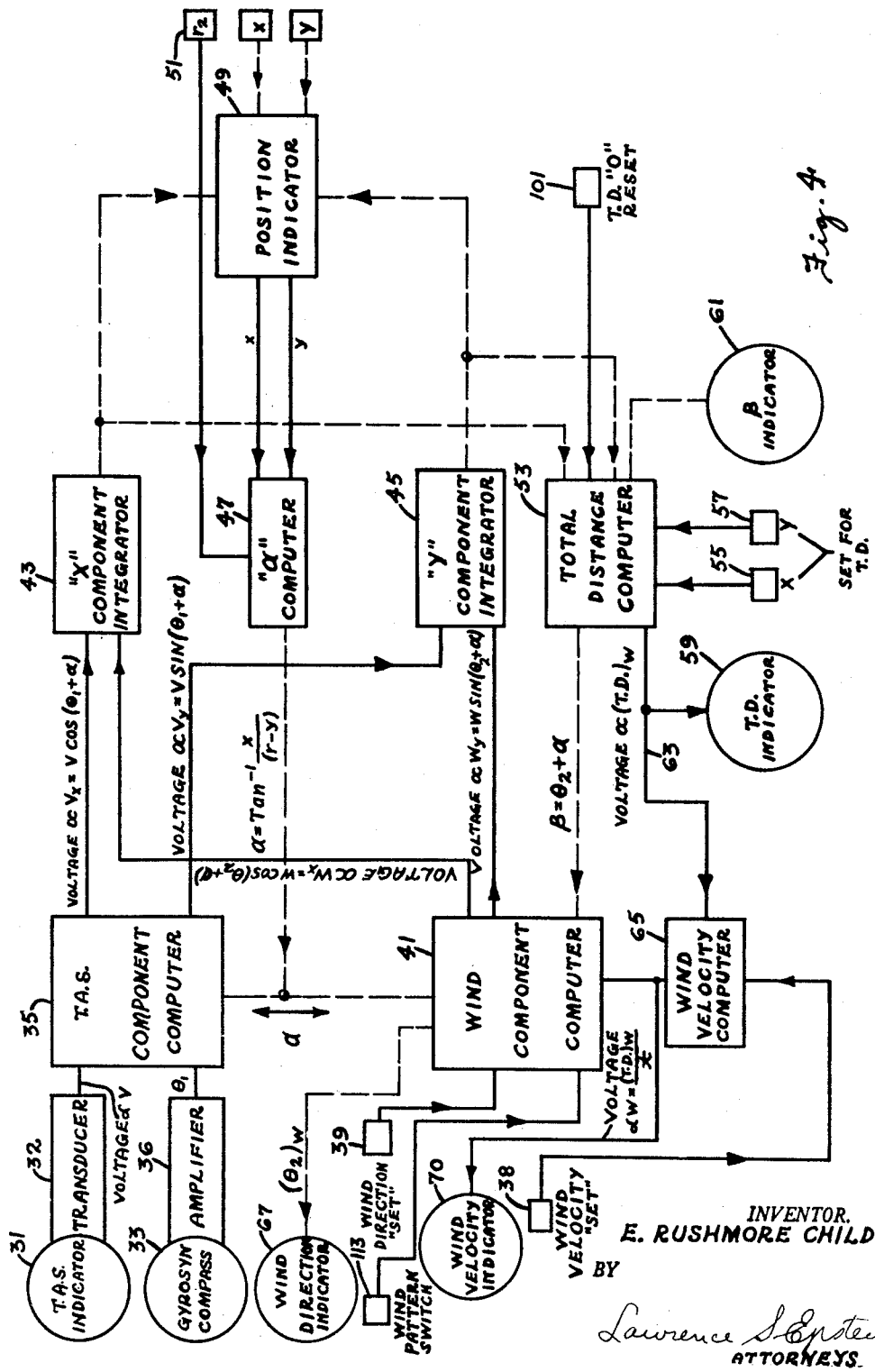

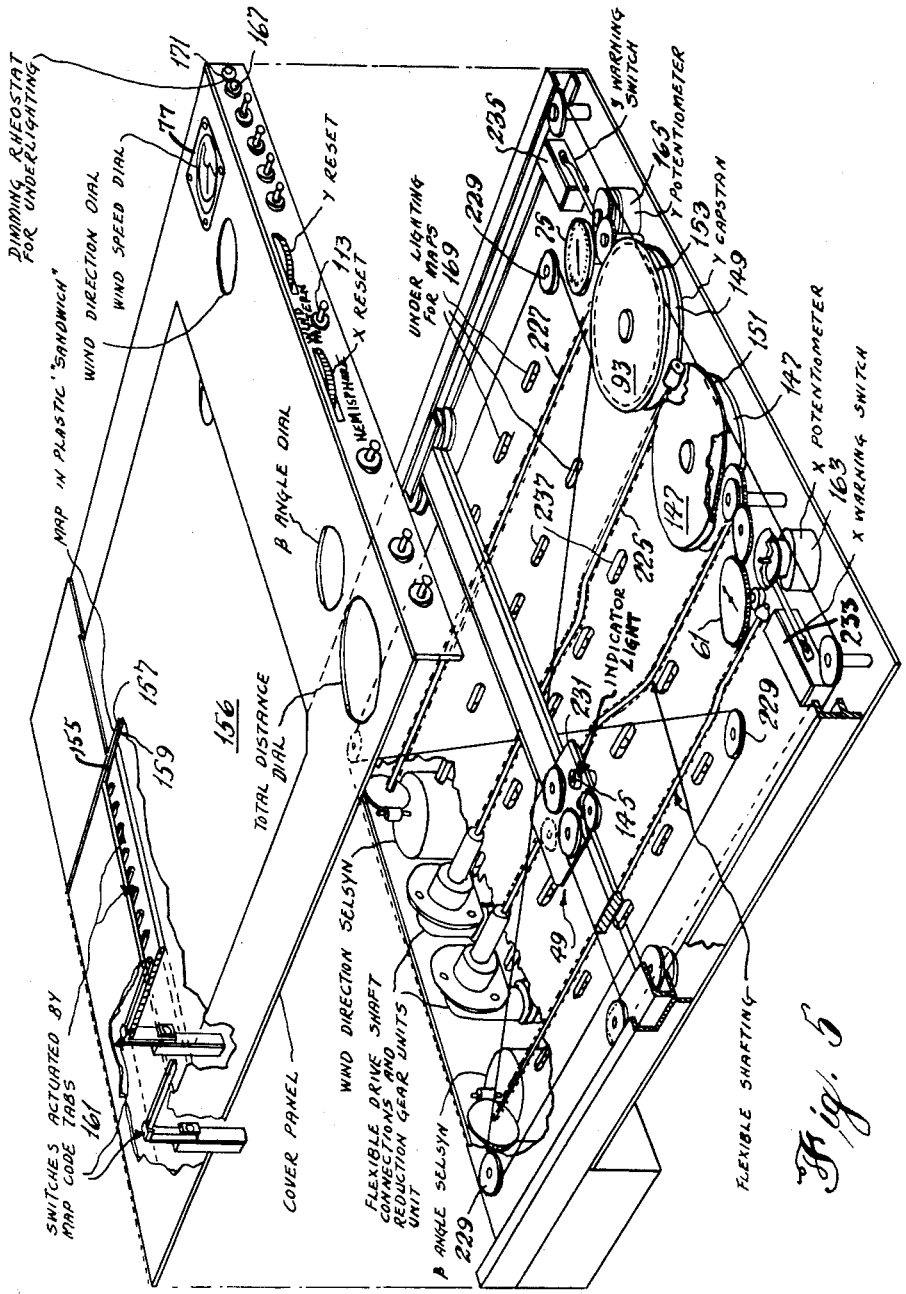

March 22, 1960

E. R. CHILD 2,929,553

AUTOMATIC AIRCRAFT NAVIGATOR

Filed Feb. 4, 1955

INVENTOR.
E. RUSHMORE CHILD

BY

Lawrence S. Epstein
ATTORNEYS

INVENTOR.
E. RUSHMORE CHILD
BY
Lawrence S. Epstein
ATTORNEYS

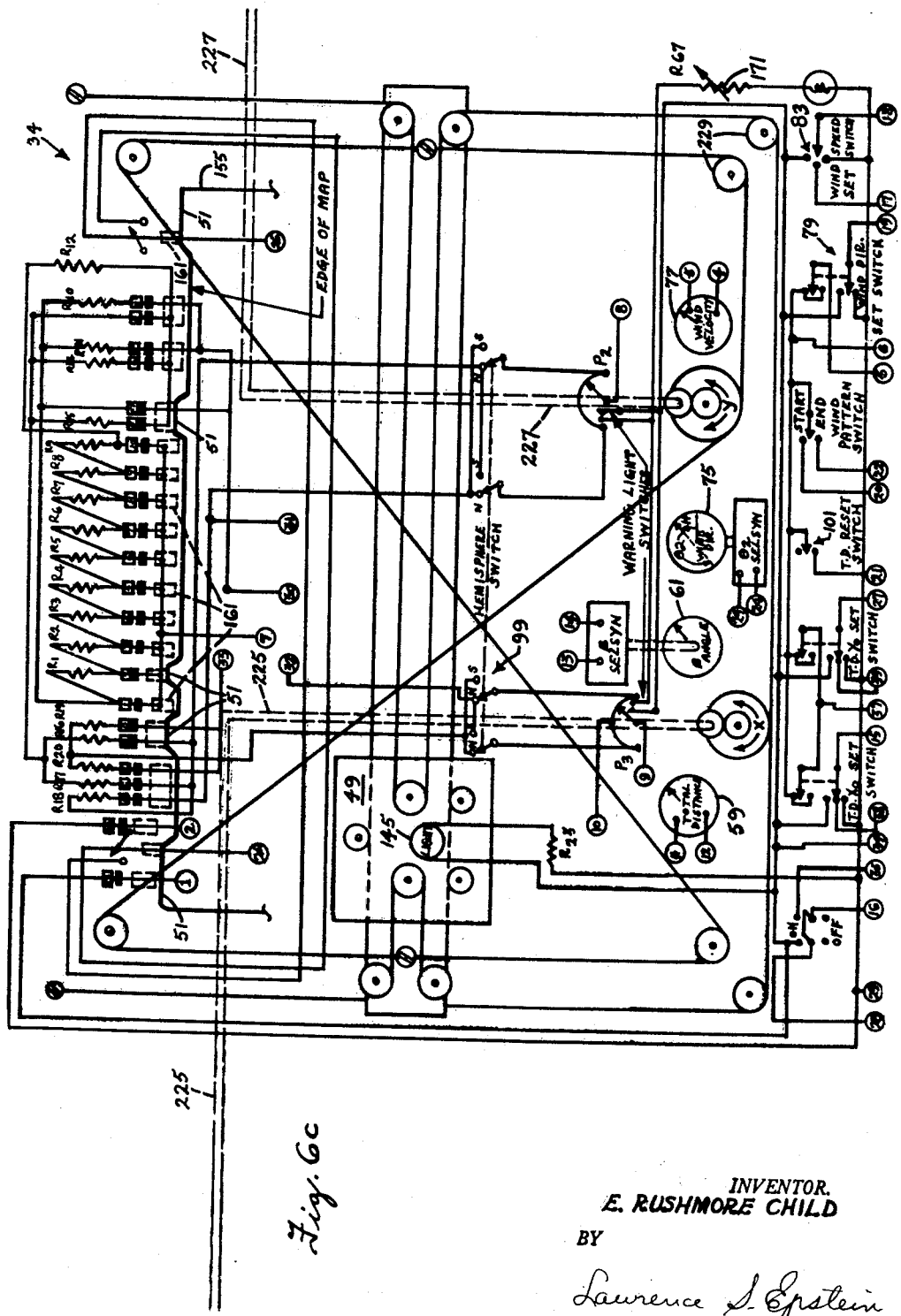

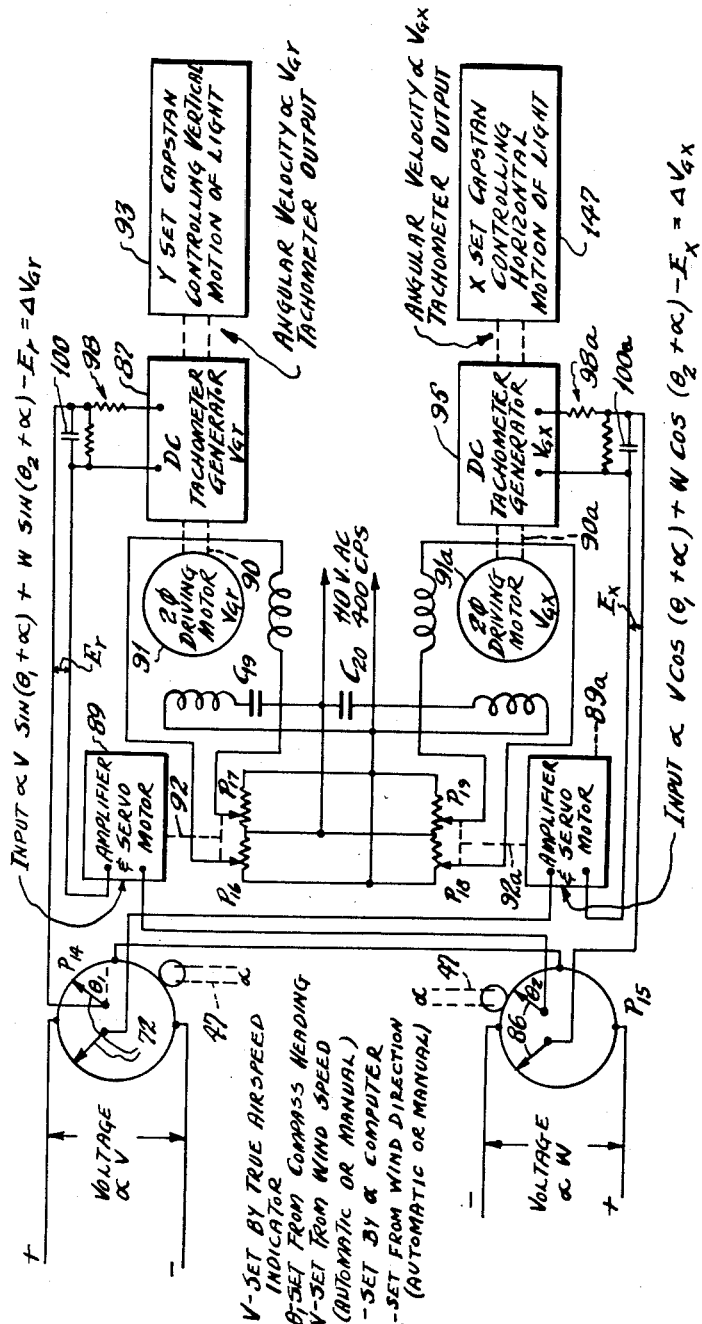

INVENTOR.
E. RUSHMORE CHILD
BY
Lawrence S. Epstein
ATTORNEYS

INVENTOR.
E. RUSHMORE CHILD

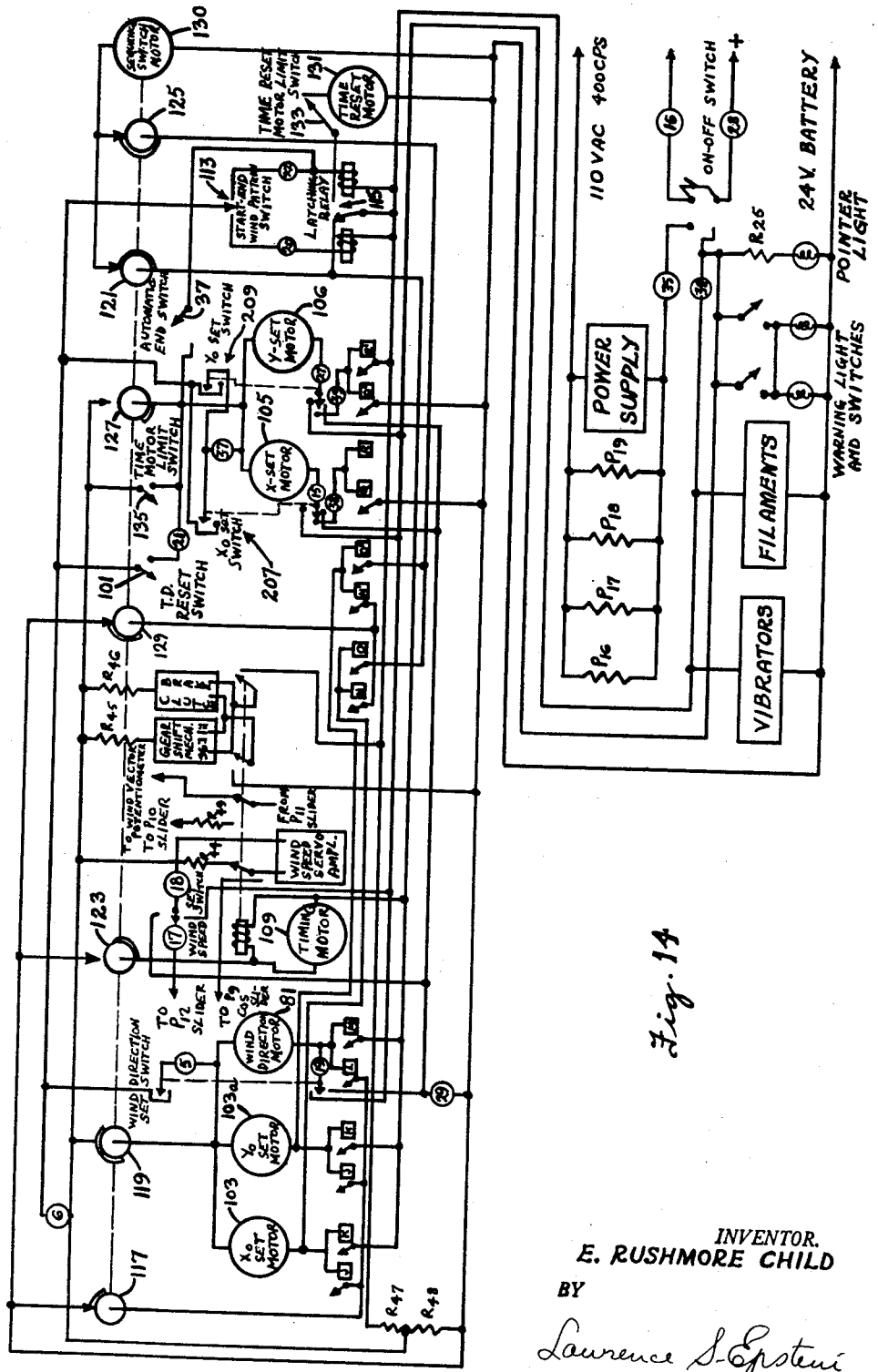

March 22, 1960
E. R. CHILD
2,929,553
AUTOMATIC AIRCRAFT NAVIGATOR
Filed Feb. 4, 1955
13 Sheets-Sheet 13
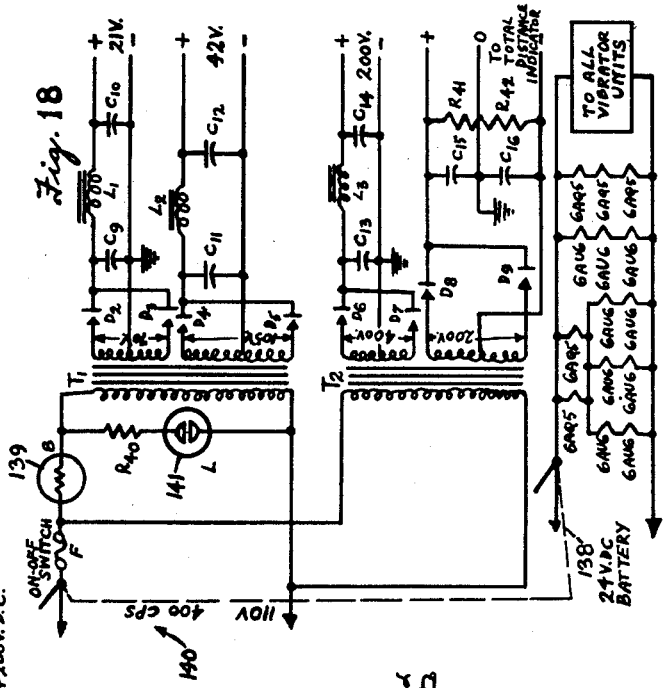
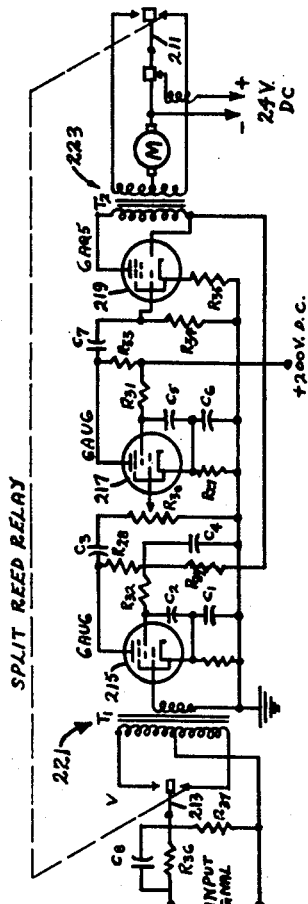
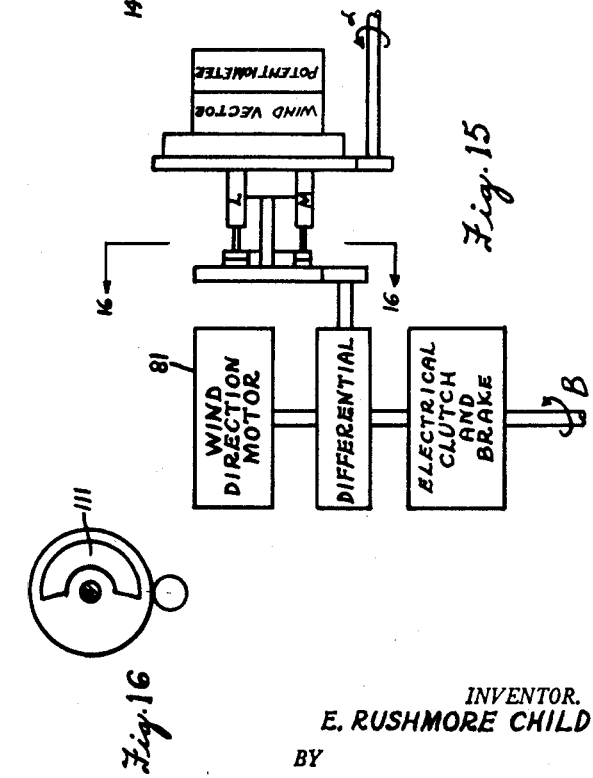
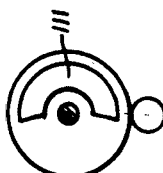
INVENTOR.
E. RUSHMORE CHILD
BY
Lawrence S. Epstein
ATTORNEYS United States Patent Office 2,929,553
Patented Mar. 22, 1960

2,929,553

AUTOMATIC AIRCRAFT NAVIGATOR

Edward Rushmore Child, Williamsville, N.Y., assignor, by mesne assignments, to the United States of America as represented by the Secretary of the Navy Application February 4, 1955, Serial No. 486,296

5 Claims. (Cl. 235—61)

This invention relates to improvements in automatic aircraft navigators, and more particularly pertains to automatic aircraft navigators adapted to solve basic dead reckoning navigation problems.

There has long been a need for an airborne light-weight position-indicating device adapted to solve the basic dead-reckoning navigation problem and to provide an operational instrument that will show the pilot of the aircraft in which it is installed an instantaneous indication of the aircraft's position with respect to the earth's surface. In practice, it is a desirable end to afford a continuous ground position indication on sectional maps, such position indication being obtained by integration with time of the sum of the wind-direction, wind-speed vector and the true compass heading-true airspeed vector. Further, automatic operation minimizing the possibility of pilot error and data presentation corrected for map distortion are desiderata. Such ends are accomplished by the subject device.

A principal object of this invention is to provide an automatic aircraft navigator adapted to solve basic dead reckoning navigation problems.

Another object is to provide an airborne light-weight position-indicating device that will show the pilot of the aircraft in which it is installed an instantaneous indication of the aircraft's position with respect to the earth's surface, corrected for inherent map distortion and derived by automatic integration with time of the sum of the wind-direction, wind-speed vector and true compass heading-true airspeed vector components.

A further object is to provide computer and data presentation equipment correlated by electrical and mechanical means to afford an automatic aircraft navigator adapted to minimize the possibility of pilot stress or pilot error in use.

Other objects and many of the attendant advantages of this invention will be readily appreciated as the same becomes better understood by reference to the following detailed description when considered in connection with the accompanying drawings wherein:

Fig. 1a is a development of a secant cone on a plane surface, and Fig. 1b is a projection of a mapped region on a secant cone, said figures showing the relationships applying to Lambert conformal conic projections and thus showing the logical sources of the subject invention;

Fig. 4 is a functional block diagram of an automatic aircraft navigator, showing a preferred embodiment of the invention;

Fig. 5 is a fragmentary exploded perspective view of the data presentation component;

Figure 8:
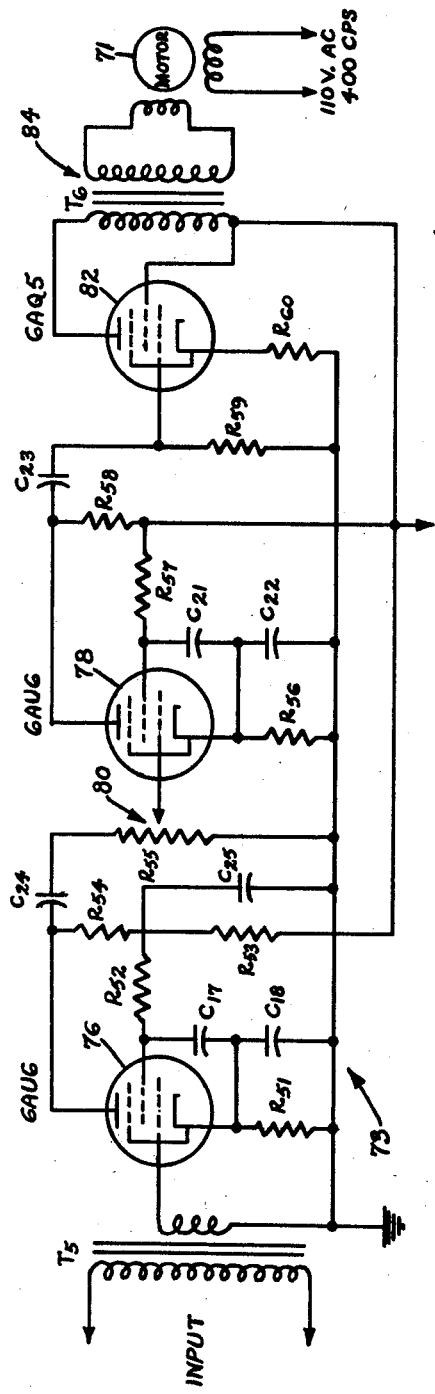
Figure 11:
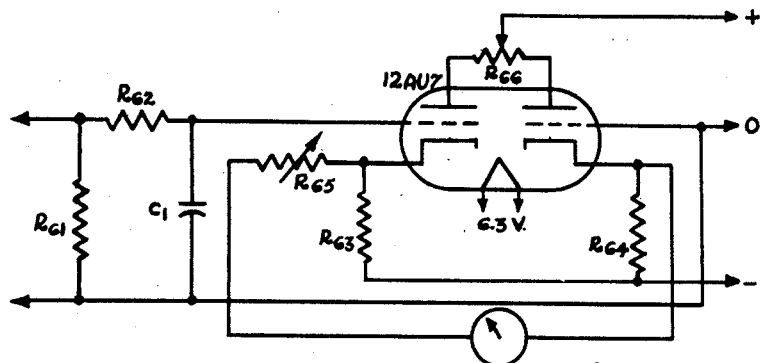
Figure 12:
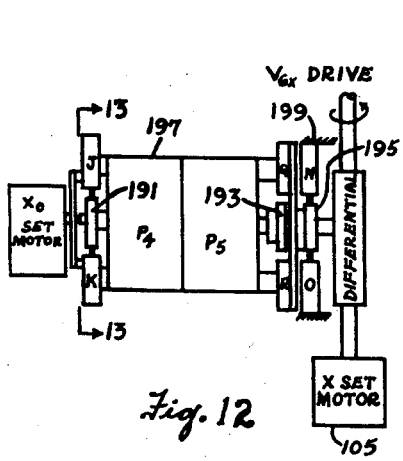
Figure 13:
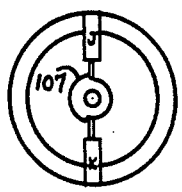
Figure 6A:
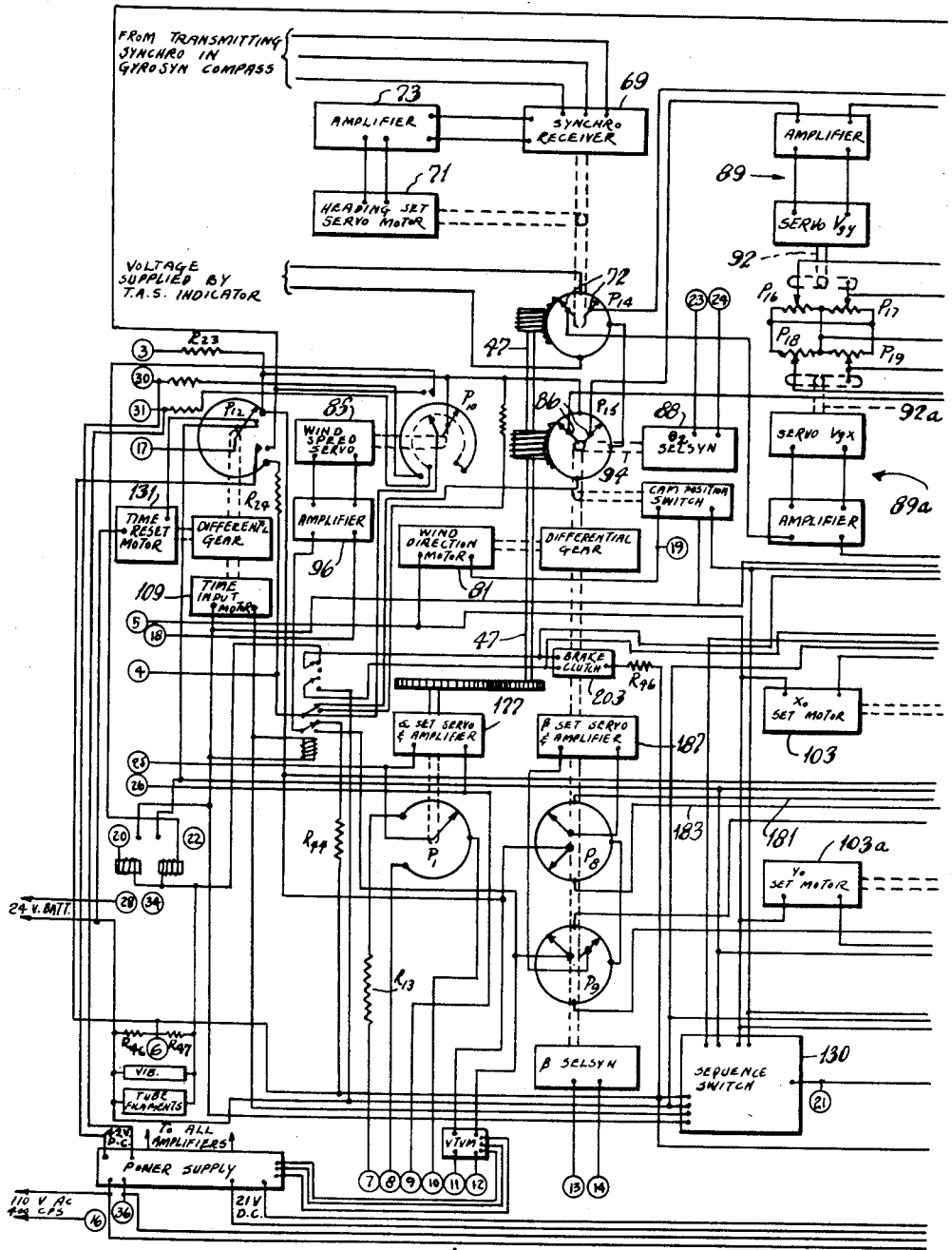
Figure 6B:
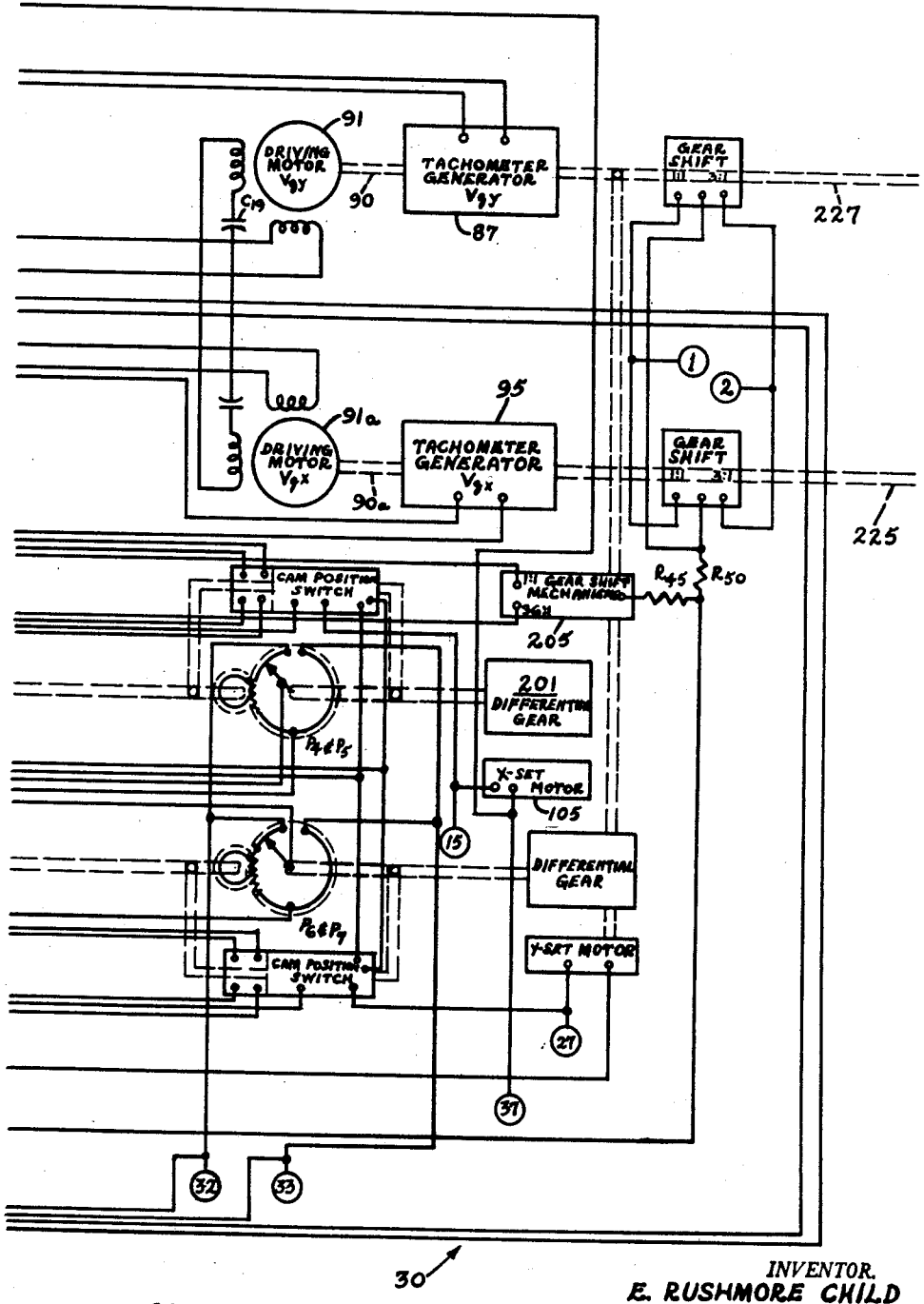
Figure 9:
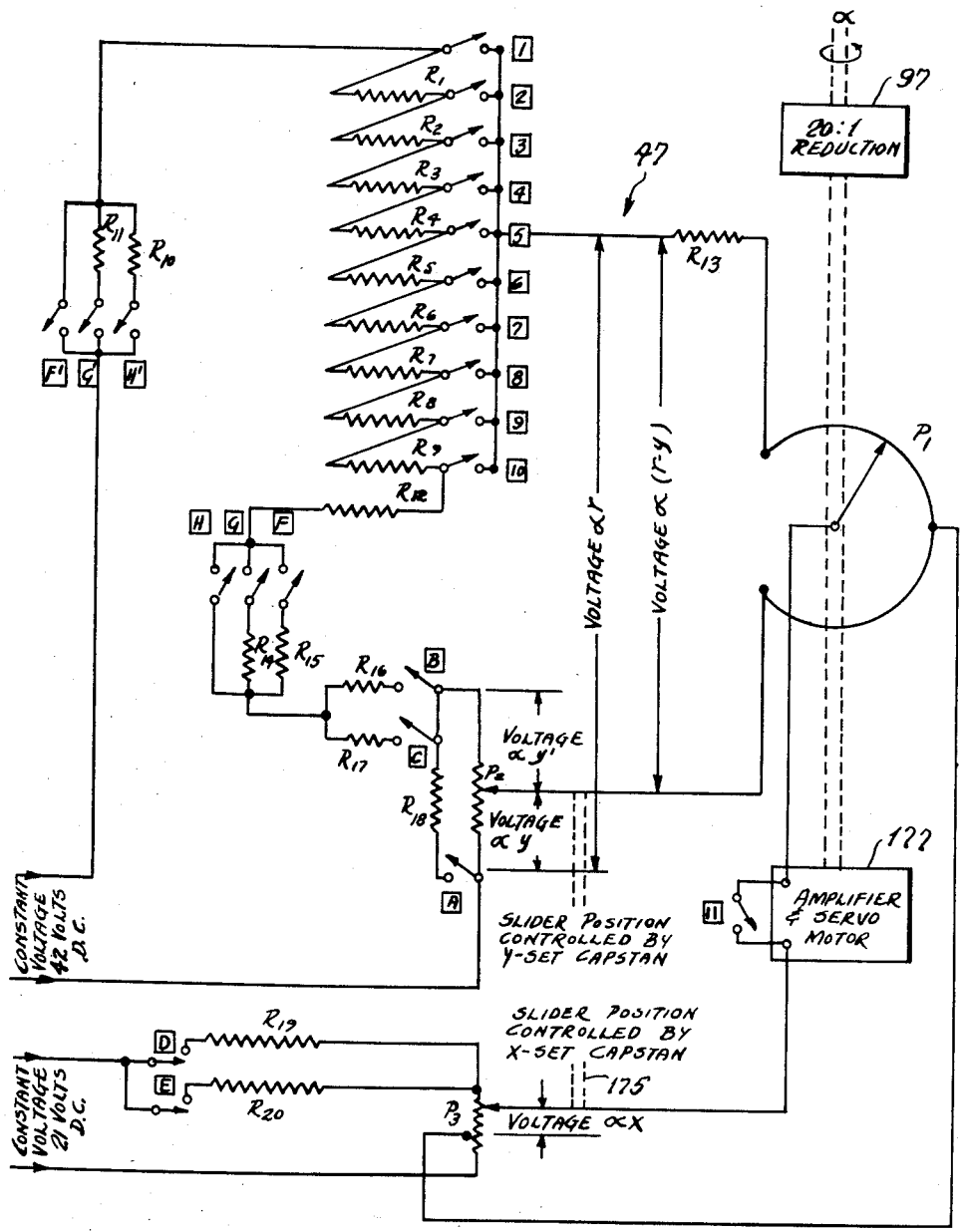
Figure 10:
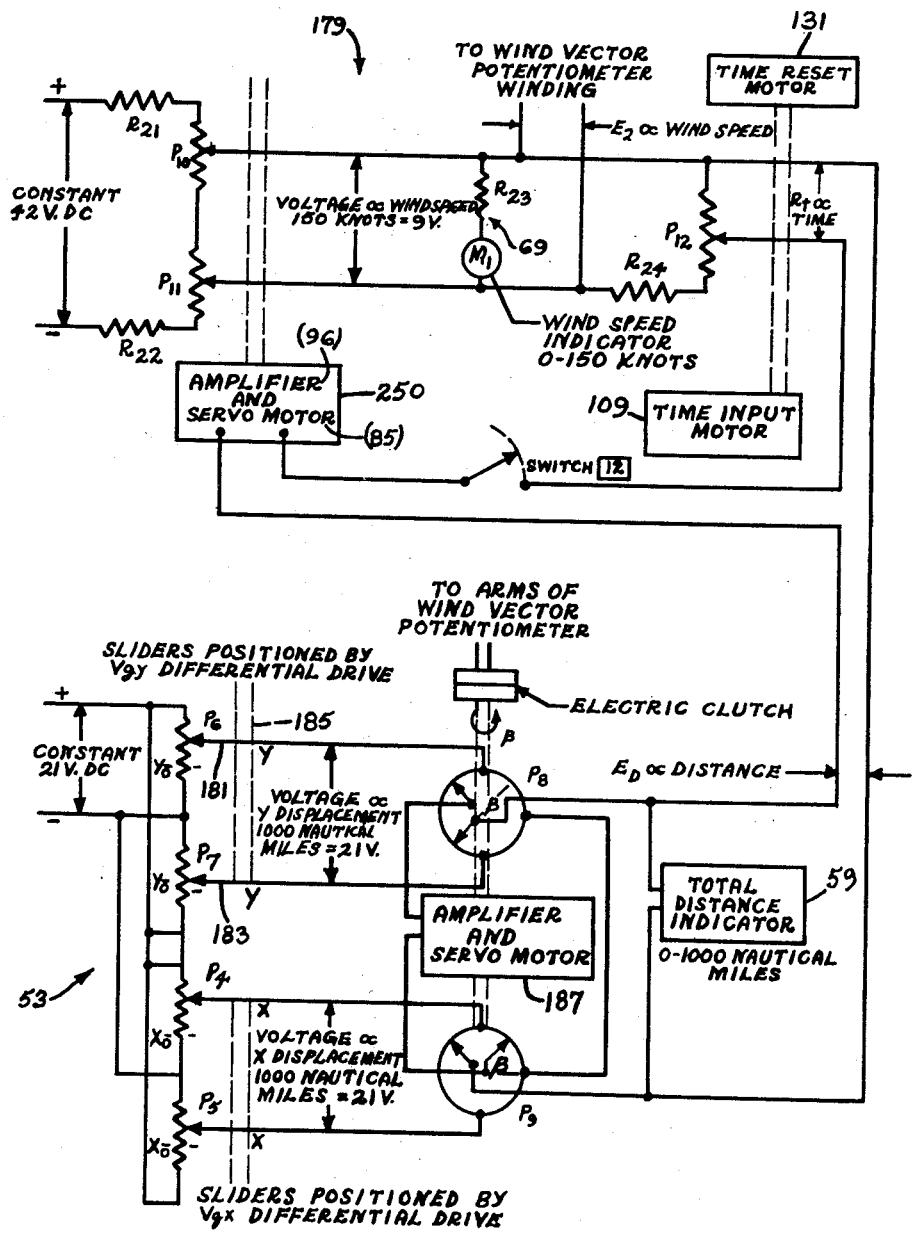

Figs. 6a, 6b and 6c, taken together, show a schematic diagram of the computer and the data presentation components;

Fig. 7 is a schematic diagram of the aircraft position computer component;

Fig. 8 is a schematic diagram of the A.C. amplifier for the heading servo motor component;

Fig. 9 is a schematic diagram of the computer for the angle $\alpha$;

Fig. 10 is a schematic diagram of the total distance and wind vector computers;

Fig. 11 is a circuit diagram of the vacuum tube voltmeter for indicating total distance;

Fig. 12 is a diagram of the arrangement of cam switches on the total distance computer potentiometers;

Fig. 13 is a section taken on the line 13—13 of Fig. 12;

Fig. 14 is a circuit diagram of the control system;

Fig. 15 is a diagram of the arrangement of cam switches on the wind vector potentiometer;

Fig. 16 is a section taken on the line 16—16 of Fig. 15;

Fig. 17 is a circuit diagram of the D.C. servo amplifier; and

Fig. 18 is a circuit diagram of the power supply system of the subject device.

Similar numerals and reference indicia refer to similar parts throughout the several views.

GENERAL ARRANGEMENT

The automatic aircraft navigator comprises two units, the computer and the data presentation equipment. These units are connected by a multi-conductor electrical cable and two flexible shafts.

The computer is equipped with input circuits which are designed to receive signals from true airspeed and airplane heading sensing instruments which are separately mounted in the aircraft. The computer is also equipped with input circuits designed to receive signals determined by the speed and direction of the wind. Two alternate methods are provided for impressing this wind vector information on the computer:

(1) The pilot receives information on the wind velocity and direction by ground or shipboard radio contact and sets this information into the computer by manual controls.

(2) The pilot flies a ground check pattern (if weather conditions permit). This pattern consists of a circuitous flight path starting and finishing over some visible fixed point on the earth's surface. (A buoy dropped into the sea is considered a fixed point for this purpose.) The pilot closes a momentary contact double throw switch in one direction when he passes over this fixed point at the start of the flight pattern and in the other direction when he passes over the same point at the end of the flight pattern. The wind speed and wind direction are then automatically computed, displayed on dials, and fed into the computer circuits which solve the dead-reckoning navigation problem.

From these input signals the computer derives output signals which are delivered to the data presentation unit in the form of shaft rotations and voltages. These outputs represent the solution of the vector problem, and are converted by the data presentation equipment into the desired form for presentation to the pilot.

Information supplied from the output of the computer is presented to the pilot on a sectional map as a point of light which at all times moves across the map in such a manner as to present the actual position of the aircraft with respect to the ground. The device includes means for providing a permanent record of the aircraft's flight path, in addition to providing the indicating point of light. The sectional map is mounted in the data presentation equipment. The data presentation equipment has been designed to reduce required manual operations to a minimum so as to minimize the demands of navigation on the pilot's time and attention.

A desired display is an indication of total distance from the point of departure. Means have been developed for accomplishing this function and have been incorporated into the design of the navigator. It was found possible to provide also, with relatively little complication of the design, means whereby the pilot can obtain indications of total distance from any reference point, such as a point of rendezvous with an aircraft carrier. The data presentation equipment contains a dial which continuously indicates total distance from the point of departure or other reference point which the pilot may select. Dials are also provided showing bearing angle from the reference point, wind direction and wind velocity. It was found that these features also could be incorporated into the design with the use of a relatively small amount of additional mechanism. The wind direction and wind velocity dials display the quantities which have been computed from the ground check pattern. The display of these data is believed to be necessary, as otherwise the pilot would have no check on the reasonableness of the automatically computed wind vector data. Also, these two dials, in connection with creep-type controls, are employed to manually set into the computer wind information obtained by radio contact.

All control switches and indicator dials are located in the data presentation equipment unit. This unit is designed so that it can be mounted in the lower part of the instrument board. When in use, the data presentation equipment unit is pulled out from the instrument panel, like a drawer. The equipment, including all of the indicating instruments and controls, is included within the dimensions of the plotting board, increased slightly in thickness, with the exception of a thicker portion of the equipment unit which remains behind the instrument panel of the aircraft. Although conditions will differ in aircraft of different models, it is believed that the unit has been designed so as not to require the shifting of instruments or controls mounted near the plotting board. The volume of the data presentation equipment unit is approximately 410 cubic inches.

The computer unit is adapted to form a 12" cube. It is designed so that it may be mounted remotely at any convenient point in the aircraft.

POWER SOURCES

In order to explain the theory of operation, it is first necessary to describe the sectional maps with which the navigator is designed to operate. These maps are of two types, having the following characteristics:

Type I: Basic scale 45 nautical miles per inch, area covered approximately 600 x 450 nautical miles.

Type II: Basic scale 15 nautical miles per inch, area covered approximatley 200 x 150 nautical miles.

The dimensions of all maps are 13.375 inches by 10 inches with the longer dimension running east and west.

The earth may be considered to be a perfect sphere on which one minute of arc of a great circle measures one nautical mile. The latitude and longitude ranges covered by each sectional map are therefore approximately as shown in the table below:

| Total Range Covered by Individual Map | Map Type | |
|---|---|---|
| | I | II |
| Latitude_____degrees__ | 7.5 | 2.5 |
| Longitude, at equator_____do____ | 10 | 3.33 |
| Longitude, at 60° latitude_____do____ | 20 | 6.67 |

Some overlap in the areas covered by adjoining maps is, of course, necessary. Ten Type I maps and thirty Type II maps are employed to cover the range from 0° to 60° north latitude, and an equal number to cover the range from 0° to 60° south latitude. The "non-overlapping" portion of each map is therefore 6° for the Type I and 2° for the Type II maps. A warning signal is actuated when the indicating light spot comes within one inch of the edge of the map. The maximum ground speed to be handled by the navigator is 850 knots (700 knots airspeed plus 150 knots wind-speed). The absolute minimum amount of time available for changing maps after the warning signal is actuated, if the indicator is not to be allowed to reach the edge of the map, is therefore 3.18 minutes with the Type I maps, 1.06 minutes with the Type II maps.

The maps are constructed on the Lambert conformal conic projection. Principles of this projection are illustrated on Figs. 1a and 1b. The mapped area ABDC is projected on a cone, having its vertex on the earth's axis, and cutting the earth at two standard parallels of latitude AB and CD. This cone is then developed on a plane. The meridians become straight lines intersecting at a point Q (the apex of the cone) which normally lies beyond the limits of the map, and the parallels become arcs of circles with centers at this point. The map is drawn true to scale on the standard parallels. The scale becomes slightly contracted in the region between the standard parallels and slightly expanded in the region outside of these parallels. The projection is carried out in a conformal manner such that, at any point, scale distortion is the same in all directions. Maximum positive and negative percent scale changes are equal when the standard parallels are chosen so that they cut the central meridian of the map at points one-sixth of the distance from the top and bottom of the map, respectively. Then the scale distortion will nowhere exceed that occurring at the latitude midway between the standard parallels, which is represented by the difference between the true length of the parallel at mid-latitude EF and the length of the projection of that parallel on the secant cone. Expressed as a percentage, this scale distortion will be $$\left(\frac{R}{R \cos (\Delta\phi/2)} - 1\right) \times 100\%$$

or $$(\sec (\Delta\phi/2) - 1) \times 100\%$$

where $\Delta\phi$ is the difference in latitude between the two standard parallels and R is the radius of the earth, which is assumed to be spherical.

The radii of the standard parallels, as drawn on the map, are found as follows: Let the standard parallels be at latitudes $\phi_1$ and $\phi_2$ and have radii on the map $r_1$ and $r_2$ respectively. It will be seen from Figs. 1a and 1b that $$\frac{r_1}{R \cos \phi_1} = \frac{r_2}{R \cos \phi_2}$$

and $$r_2 - r_1 = 2R \sin ((\phi_1 - \phi_2)/2)$$

Eliminating $r_1$, solving for $r_2$ and substituting $\phi_2 + \Delta\phi$ for $\phi_1$ we have $$r_2 = \frac{2R \sin (\Delta\phi/2)}{1 - \frac{\cos (\phi_2 + \Delta\phi)}{\cos \phi_2}}$$

$$= \frac{2R \sin (\Delta\phi/2)}{1 - \cos \Delta\phi + \tan \phi_2 \sin \Delta\phi}$$

At any point on the map, the angle $\alpha$ which the local meridian makes with the central meridian is given by $$\tan \alpha = \frac{x}{r_2 - y}$$

where $x$ and $y$ are the rectangular coordinates of the point, measured respectively from the central meridian and from a line perpendicular to the central meridian drawn through the intersection of that meridian and the lower standard parallel of latitude.

Figure 2:
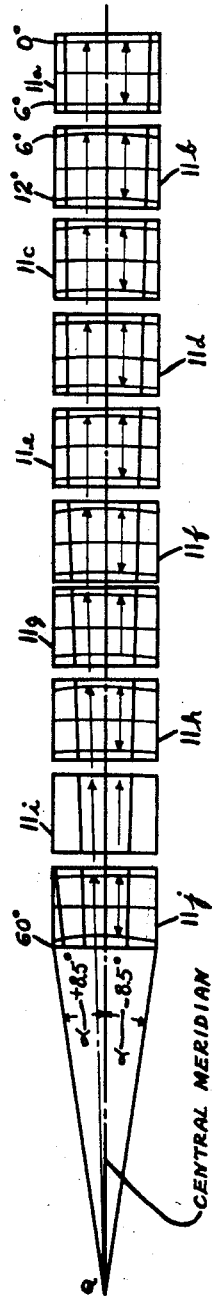
Fig. 2 is a diagram of the characteristics of Lambert sectional maps.

Principal features of a group of Type I sectional maps, 11a to 11j constructed on the Lambert conformal conic projection, covering the latitude range from 0° to 60°, are indicated on Fig. 2. The standard parallels are taken at 0° and 6° latitude on the map covering the region nearest to the equator, 6° and 12° latitude on the next map, etc. For these maps the scale deviation at mid-latitude is (sec $(6°/2) - 1) \times 100\% = 0.14\%$. This is the maximum deviation which occurs, since the distance from a standard parallel to the edge of a map is less than one-sixth of the map width.

Since it is known that the radius of the earth $R = 3438$ nautical miles we have $$r_2 - r_1 = 2 \times 3438 \sin (6°/2)$$
$$= 359.8 \text{ nautical miles}$$
$$= 8.00'' \text{ on Type I map}$$

The formula for $r_2$ in nautical miles becomes $$r_2 = \frac{359.8}{0.00548 + 0.10453 \tan \phi_2}$$

The values of $r_2$ which have been computed for each map are shown on Fig. 2.

For the design of the computer it is necessary to know the range of values which will be assumed by $\alpha$ within the confines of the maps. It is obvious that for the Northern Hemisphere the maximum positive and negative values will occur at the upper corners of the map which covers the region at the highest latitude. Similarly, for the Southern Hemisphere, the maximum positive and negative values of $\alpha$ will occur at the lower corners of the map which covers the region of greatest south latitude. The corresponding maximum value of $\alpha$ are $+8.5°$ and $-8.5°$, as shown for the Northern Hemisphere on Fig. 2.

Maps similar to those in the group shown cover the regions to the east and west, the number of maps required to encircle the earth decreasing as the latitude increases.

In constructing the Type II maps, it is expected that the same series of standard parallels will be used as for the Type I maps, namely those at 0°, 6°, 12°, ... 48°, 54° and 60° latitude. Then each Type II map will be exactly geometrically similar to a portion of a Type I map, but "blown up" to three times the size. (It will be noted that standard parallels at 0° and 6°, for example, will be used to construct maps the "non-overlapping" portions of which extend from 0° to 2° latitude, 2° to 4°, and 4° to 6°. If separate pairs of standard parallels were used for the maps covering these three ranges of latitude, the resulting change in the maps would be imperceptible, since the maximum scale error is only 0.14% with the standard parallels 6° apart.)

GENERAL THEORY OF OPERATION

Essentially, the automatic navigator determines the position of the aircraft with respect to the surface of the earth from the time integral of the ground velocity vector, which is the vector sum of the velocity of the aircraft with respect to the air and the velocity of the air mass with respect to the ground—i.e., the wind velocity vector. The procedure used is to determine the time integral of two components of the ground speed. Components are taken in the directions represented by lines perpendicular and parallel, respectively, to the central meridian of the sectional map in use in the data presentation equipment. These components are obtained by adding the components of the true airspeed and wind vectors, which are resolved in the directions of the "OX" and "OY" axes of the sectional map, as shown for the true airspeed vector in Fig. 3. The "OX" and "OY" axes make the angle $\alpha$ with the south-toward-north and west-toward-east directions, respectively. This angle varies from point to point on the Lambert polyconic projection, in accordance with the formulas which have been given. It must be introduced as a correction in the resolving apparatus of the navigator.

The operation of the navigator will be described in general terms with the aid of the functional block diagram shown on Fig. 4. This diagram is intended to clarify the operation by showing the various functions that are performed, without reference to the details of the mechanisms used. The principal operations performed are listed below:

(1) Resolution of the true airspeed vector.
(2) Resolution of the wind speed vector.
(3) Integration of the $x$ components of the air and wind speeds.
(4) Integration of the $y$ components of the air and wind speeds.
(5) Correction of error introduced by plotting in rectangular coordinates on a Lambert map.
(6) Calculation of the total distance.
(7) Calculation of the wind vector.

The blocks in the diagram indicate places where these various operations are performed, while the connecting lines show the channels along which the information flows, electrical couplings being shown by solid lines and mechanical linkages (or the equivalent of coupling through selsyns) being shown by broken lines.

A true airspeed indicator 31 feeding through a transducer 32 and gyrosyn type compass 33 feeding through an amplifier 36 constantly deliver to the airspeed component computer 35 the information necessary to construct the airspeed vector. This information consists of the true heading ($\theta_1$) of the aircraft (measured from the east-toward-west line, see Fig. 3 and the true airspeed V. Also supplied to the airspeed component computer 35 by the $\alpha$ computer is the angle $\alpha$ which must be added to $\theta_1$ to correct for the error introduced by plotting in rectangular coordinates on a Lambert type map. Using this information, the airspeed component computer 35 delivers two signals: one, $V_x = V \cos (\theta_1 + \alpha)$, representing the corrected $x$ component of true airspeed, the other, $V_y = \sin (\theta_1 + \alpha)$, representing the corrected $y$ component of wind vector.

The $x$ and $y$ components of ground velocity are given respectively by $$V_{gx} = V \cos (\theta_1 + \alpha) + W \cos (\theta_2 + \alpha)$$
and
$$V_{gy} = V \sin (\theta_1 + \alpha) + W \sin (\theta_2 + \alpha)$$

The $x$ component integrator 43 takes the corrected $x$ components of the air and wind velocities, $V \cos (\theta_1 + \alpha)$ and $W \cos (\theta_2 + \alpha)$, and integrates their sum over time. The integration appears as a mechanical motion which controls the horizontal displacement on the map of the position indicator 49. In identical fashion, the $y$ component integrator 45 takes the two corrected $y$ components of the air and wind velocities and integrates their sum over time, this integration appearing as a mechanical motion which controls the vertical displacement of the position indicator 49.

To compute the angle $\alpha$, the $\alpha$-computer 47 requires a knowledge of the radius $r_2$ of the lower standard parallel used in the construction of the map in use and a knowledge of the $x$ and $y$ displacement of the position indicator 49 from a point of origin located at the center of the lower edge of the plotting board. Properly coded tabs 51 on the sectional maps 155 (see Fig. 6c) insure that the correct $r_2$ value is automatically supplied to the $\alpha$-computer 47 whenever a particular map is inserted in the plotting board 156, while information on the $x$ and $y$ displacements is supplied by the position computer.

After properly solving the α equation with the data supplied. the α-computer 47 inserts the result into the true airspeed component computer 35 and wind speed component computers 41.

To perform its function, the total distance computer 53 requires information concerning only the *x* and *y* displacement of the aircraft from its initial point of departure. These data are supplied by the *x* and *y* component integrators 43 and 45 respectively. With these data, the total distance computer 53 calculates the straight line distance of the aircraft from the point of departure, and the angle between this line and the *x* axis. These two results are then delivered to the total distance indicator 59 and the β-indicator 61. As explained earlier, an arrangement is also provided which permits using a reference point other than the initial point of departure from which to measure the total distance and bearing. When this arrangement is used, the coordinates of the reference point with respect to the point of departure are inserted manually into the total distance computer 53 by the *x* total distance set 55 and the *y* total distance set 57 in addition to the data supplied automatically by the *x* and *y* component integrators 43 and 45 respectively.

When it is desired to determine the wind vector, the pilot flies a ground check pattern consisting of a circuitous path starting and ending over the same ground reference point. While this flight path is being flown, no wind vector data are fed into the navigator circuit (i.e., the navigator operates as though the wind speed were zero). Then, at the end of this flight path, the total distance computer 53 output is proportional to the time integral of wind velocity. When divided by the time required to make the circuitous flight, the wind speed is obtained (assuming that it did not change while the ground check pattern was being flown). Also, at the instant the check pattern has been completed, the angle β represents the direction of the wind.

At the start of the ground check pattern, the wind pattern switch 113 is actuated, producing four results:

(1) The coordinates of the ground reference point are inserted into the total distance computer 53, so that the total distance during the wind flight pattern is measured with respect to the ground reference point.

(2) For greater accuracy, the rates at which mechanical motions are fed into the total distance computer 53 are increased by the ratio 36:1.

(3) The total distance computer output or channel 63 is connected to the wind velocity computer 65.

(4) The voltage representing wind velocity is disconnected from the wind component computer 41.

At the end of the ground check pattern, the wind pattern switch 113 is again operated, producing the following four effects:

(1) The coordinates of the original point of departure (or other reference point) are reinserted into the total distance computer 53.

(2) The rates at which mechanical motions are fed into the total distance computer 53 are reduced to their original values.

(3) The channel 63 between the total distance computer 53 and the wind velocity computer 65 is disconnected.

(4) The voltage representing the computed wind velocity is connected to the wind component computer 41 and the bearing angle β is introduced into the wind component computer 41.

The other indicators and controls shown in the diagram of Fig. 4 are believed to be self-explanatory. The wind component computer 41 transmits the wind angle data it receives directly to the wind direction indicator 67. Similarly, the wind velocity computer 65 provides the wind velocity indicator 70 with the information necessary for its operation.

Operation of the various parts of the navigator is described in detail hereinbelow.

COMPUTER DESIGN

The circled numerals on Figs. 6a, 6b and 6c indicate the electrical and mechanical linkages among said figures.

The computations required by the automatic aircraft navigator are performed by electro-mechanical servo-mechanisms. Cartesian coordinates are used in the solution of the geometrical problems. Sinusoidal potentiometers are employed for the resolution of vector quantities into components. Integrations are performed by monitoring shaft rotational speeds with D.C. tachometer generators, the outputs of which are made equal to the appropriate input signals. Mechanisms of this type were selected for the following reasons:

(1) High accuracy is obtainable, essentially unaffected by wear and friction.

(2) The system lends itself to miniaturization through the use of small electrical components.

(3) The methods used are direct and simple.

INPUT CIRCUITS

The computer input circuits have been designed to receive signals representing heading, true airspeed, wind direction and wind velocity.

Heading

Heading information is obtained from a gyro-stabilized compass 33. The compass master indicator unit is coupled to a synchro transmitter. As shown in the upper left hand part of Fig. 6a, the transmitter is electrically connected to a synchro receiver 69 which is mechanically coupled to the sliders 72 of the sinusoidal airspeed potentiometer $P_{14}$ (see also Fig. 7). These sliders and the synchro receiver 69 are rotated by a two phase servo motor 71, one phase of which is controlled by an amplifier 73, diagrammed in Figs. 6a and 8, which receives an input signal resulting from the difference in angular position of the transmitting and receiving synchros.

Such input is transformer coupled to the grid of a first vacuum tube amplifier 76, which in turn is coupled to a second vacuum tube amplifier 78 through a plate circuit potentiometer 80. The A.C. component of the output of tube 78 is applied to the grid of a third vacuum tube amplifier 82, and the screen to plate current of tube 82 applied across the primary of transformer 84 to excite one winding of motor 71. By this system the sliders of potentiometer $P_{14}$ are accurately positioned to an angle corresponding to the aircraft heading, and yet no appreciable torque load is imposed on the compass.

True airspeed

The computer 30 is designed to receive an input voltage signal directly proportional to true airspeed and equal to 6 volts D.C. per 100 knots, when feeding into a constant load of 15,000 ohms. A true airspeed indicator 31 and transducer 32 is arranged to supply this signal.

Wind direction and speed

The computer 30 is designed so that information on wind direction and speed may be introduced either manually from information received by radio contact or automatically as a result of a ground check pattern flown by the pilot. In either case, the wind direction and speed which have been introduced are displayed on dials in the data presentation equipment 34. The wind direction dial 75 is graduated in terms of the direction from which the wind is blowing; the wind speed dial 77 is graduated in knots.

When the first method of introducing wind vector information is used, the pilot adjusts the wind direction and speed to the values which have been reported to him by radio by operating momentary contact double throw switches in the data presentation equipment. The wind direction set switch 79 causes the wind direction motor 81 (see Fig. 6a) to rotate in either direction until the sliders 86 on the wind vector potentiometer $P_{15}$ are correctly positioned, as indicated by the wind direction dial, operated from the "$\theta_2$ selsyn" 88 which is geared to the shaft 94 carrying the sliders 86 of potentiometer $P_{15}$. Similarly, the wind speed set switch 83 causes the wind speed servo motor 85 to rotate in either direction so as to increase or decrease through amplifier 96 the voltage supplied to potentiometer $P_{15}$. This voltage is indicated on the wind velocity dial 77, which is a voltmeter calibrated in knots of wind velocity.

When the second method of introducing wind vector information is used, the pilot flies a ground check pattern, as described above. Wind information is then automatically computed, the sliders 86 of the wind vector potentiometer $P_{15}$ are automatically set to the angle corresponding to the wind direction and the voltage across this potentiometer is automatically set to a value corresponding to the wind velocity.

ELECTRICAL DESIGN

The electrical design of the various parts of the computer will now be described in detail.

Aircraft position computer

A diagram showing the aircraft position computer is shown in Fig. 7. A voltage proportional to the true air speed is delivered to the sinusoidally wound potentiometer $P_{14}$ by the true airspeed indicator 31, while a voltage proportional to the wind speed is delivered to the sinusoidally wound potentiometer $P_{15}$ either by means of a manual control or automatically by means of the wind vector computer 41, as previously explained. By means of the remote torque control system which has been described, the two sliders on $P_{14}$ are constrained to move so as to follow precisely the motion of the compass, while the sliders on $P_{15}$ are positioned to correspond to the wind direction by either a manual control or automatically by means of the said wind vector computer. The computer for angle $\alpha$ introduces the $\alpha$-correction into these two potentiometers by rotating the outer cases and hence the windings of potentiometers $P_{14}$ and $P_{15}$ with respect to their sliders. The voltages delivered by $P_{14}$ are thus proportional to $V \cos (\theta_1+\alpha)$ and $V \sin (\theta_1+\alpha)$, while those delivered by $P_{15}$ are proportional to $W \cos (\theta_2+\alpha)$ and $W \sin (\theta_2+\alpha)$, where $\theta_1$ is the angle between the longitudinal axis of the aircraft and true east, and where $\theta_2$ is the angle between the wind vector and true east.

The voltages proportional to $V \cos (\theta_1+\alpha)$ and $W \cos (\theta_2+\alpha)$ are added together and their sum is balanced against the output of the $V_{gy}$ D.C. tachometer generator 87. Any unbalance produces an error signal which is amplified and used to control the direction and speed of rotation of a permanent magnet D.C. servo motor 89. This servo motor 89 operates to maintain the speed of the $V_{gy}$ driving motor 91, which is geared to the tachometer generator 87 by linkage 99 at the value which reduces the error signal toward zero.

The output shaft 92 of the servo motor positions the sliders on potentiometers $P_{16}$ and $P_{17}$ and thus controls the magnitude and phase of the voltage applied to one winding of the main driving motor, which is of the two-phase induction type. The voltage across the fixed phase is always 90 degrees out of phase with the line voltage, which is supplied from the unregulated 110-volt, 400-cycle power source of the aircraft. When the sliders on $P_{16}$ and $P_{17}$ are displaced to the right of their center positions, the voltage applied to the control winding is in phase with the line voltage; when the sliders are displaced to the left, the control voltage is 180 degrees out of phase with the line voltage. Hence, when the sliders pass through their center positions, the driving motor reverses its direction of rotation. The shaft of the motor is connected through a gear train to a flexible shaft which drives the $v$ capstan 93 in the data presentation equipment unit 34 which moves the indicating light 145 over the map in the vertical direction.

In a similar manner, the voltages proportional to $V \cos (\theta_1+\alpha)$ and $W \cos (\theta_2+\alpha)$ are added together and balanced against the output of the $V_{gx}$ D.C. tachometer generator 95, which monitors the rate at which the indicating light 145 in the data presentation equipment 34 is driven over the map in the horizontal direction. The components of the horizontal drive are designated by the same numerals as the components of the vertical drive, with the subscript "$a$" added.

It will be noted that, if the $\alpha$-correction were not inserted into the true air speed and wind vector potentiometers, the position computer would move the indicating light 145 to the right with a velocity proportional to the component of ground speed of the aircraft toward the east and toward the top of the map with a velocity proportional to the component of ground speed of the aircraft toward the north. But on a Lambert projection map, east is to the right and north upward only on the central meridian.

Figure 3:
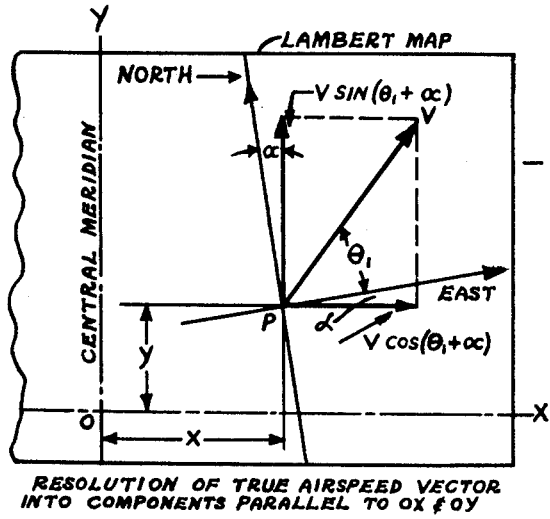
Fig. 3 is a diagram showing the resolution of the true airspeed vector into components parallel to the OX and OY axes, explaining the principles of correction of aircraft position computers for Lambert maps.

Let the position of the aircraft be represented on a Lambert map by point P with Cartesian coordinates $x$ and $y$, as shown on Fig. 3. Let the true airspeed vector be V, making the angle $\theta_1$ with the east direction. Then, the component of the true air speed represented on the map by motion parallel to OX will be $V \cos (\theta_1+\alpha)$. Likewise, the component of true air speed represented on the map by motion parallel to OY will be $V \sin (\theta_1+\alpha)$. Voltages proportional to these two components are derived as illustrated in Fig. 3. The resistance element of the true airspeed vector potentiometer is rotated through the angle $\alpha$, while $\theta_1$ is introduced by rotating the sine-cosine sliders. The two voltages proportional to $W \cos (\theta_1+\alpha)$, and $W \sin (\theta_2+\alpha)$ are derived in identical fashion.

Choice of a two-phase induction motor for the main drive motor was dictated by the requirement for smooth performance at all speeds from zero to the maximum r.p.m. in either direction. The two-phase induction motor satisfied this requirement.

In order to provide for adjustment of the tachometer generator outputs to properly match the input voltages, the speed monitoring signals $E_y$ and $E_x$ are actually taken from voltage dividers 98 and 98$a$ connected across the terminals of the tachometer generators 87 and 95 respectively, as shown in Fig. 7. Condensers 100 and 100$a$ are connected across $E_x$ and $E_y$, to minimize the effects of commutator ripple.

The power that can be delivered by the D.C. tachometer generators or by the relatively high impedance potentiometers without destroying their linear or sinusoidal characteristics is only a small fraction of the power required to operate a servo motor. It is, therefore, necessary to use an amplifier or sensitive relay between the servo motor and the error signal in order to be able to supply the motor from a separate power source. An amplifier was chosen for the basic design rather than the relay, since it was known that amplifiers of the type required have been used successfully in aircraft, whereas the performance of sensitive relays under the conditions of operation encountered in airborne equipment is more or less an unknown factor. The amplifiers selected are a stable D.C. chopper type and are described hereinbelow. These amplifiers provide the power necessary to drive the permanent magnet D.C. motors which serve as servo motors.

Alpha computer

Taking the origin of coordinates on the central meridian at the lower edge of the map, the equation for $\alpha$ can be written, for the Northern Hemisphere, $$\tan \alpha = \frac{x}{r-y}$$

where $x$ = horizontal travel from the central meridian (positive to the right), in inches $y$ = vertical travel measured upward from the lower edge of the map, in inches $r$ = radius of the "base" parallel of latitude, which is tangent to the edge of the map nearest to the equator (the lower edge in the Northern Hemisphere).

Here $\alpha$ is chosen to be positive when $x$ is positive.

In the Southern Hemisphere the equation for $\alpha$ becomes $$\tan \alpha = -\frac{x}{r-y'}$$

where $x$ and $r$ are defined as before (but the base parallel of latitude is now at the upper edge of the map) and $y$ is the vertical travel measured downward from the upper edge of the map. The minus sign must be applied to the righthand side of the equation because of the fact that, for positive values of $x$, the sense of $\alpha$ is opposite in the Northern and Southern Hemispheres. It is apparent that $y' = h - y$, where $h$ is the height of the map.

A schematic diagram of the computer for the angle $\alpha$ is shown in Fig. 9. For simplicity, the circuits are drawn for this computer as it is employed in the Northern Hemisphere only. An additional switch, which will be explained later, is required to make the computer applicable to both hemispheres.

For solution by the computer shown, the equation for $\alpha$ in the Northern Hemisphere is first put into the form $$(r-y) \sin \alpha - x \cos \alpha = 0$$

Because $\alpha$ varies only between 0 and $+8.5°$ it is possible to use certain approximations ($\sin \alpha$ equals $\alpha$ and $\cos \alpha = 1$) without introducing significant error. The equation actually solved by the $\alpha$ computer is $$(r-y)\frac{\alpha}{0.996} - x = 0$$

where $\alpha$ is expressed in radians. The solutions of this equation do not differ appreciably from those of the exact equation over the small range of $\alpha$ involved.

A voltage proportional to $x$ is obtained by positioning the slider of the linear potentiometer $P_3$ with the motion of the $x$ capstan 147 in the data presentation unit 54 through linkage 175. A voltage proportional to $(r-y)$ is obtained between the slider on the linear potentiometer, $P_2$, and a tap on the potential divider composed of the fixed resistors $R_1$ through $R_9$. The slider of the potentiometer $P_2$ is positioned by the motion of the $y$ capstan 93 in the data presentation unit, while a coded tab on the map in use, by actuating one of the switches 1 through 10, automatically selects the proper tap on the potential divider for that map.

The resistances forming the $r-y$ potential divider network were computed by selecting 1000 ohms to correspond to the largest $r$ value encountered in either type map. This procedure reduces the number of taps required and is made feasible by reducing by a factor of three the value of the voltage across $P_2$ and $P_3$ when a Type II map is inserted.

Other switches shown in Fig. 9 are also actuated by coded tabs on the map and permit small changes to be made in the potential divider to correct for the variations in the $r$ values of the Type II maps, and also provide a means for compensating for the increased rate of travel of the $x$ and $y$ capstans when Type II maps are used. It will be noted that Type II maps which cover the latitude ranges 0° to 2°, 2° to 4° and 4° to 6° (exclusive of overlap) are all constructed on standard parallels at 0° and 6°.

To obtain a voltage proportional to $$(r-y)\frac{\alpha}{0.996}$$

the voltage proportional to $(r-y)$ is applied across the combination of the fixed resistor $R_{13}$ and the linear potentiometer $P_1$, the desired voltage then being obtained between the center tap of $P_1$ and the slider. To obtain increased resolution, the angular displacement of the slider on $P_1$ from the center tap is varied. Neglecting the impedance of the source supplying the $(r-y)$ voltage, the voltage between the slider and the center tap of $P_1$ is proportional to $(r-y)z/(R_{13}+P_1)$ where $z$ is the resistance between the center tap and the slider and $P_1$ is used to designate the total resistance of the potentiometer winding. Since $z$ is proportional to the angular displacement, being given by $$z = \frac{\frac{1}{2}P_1}{0.1532}\alpha$$

where 0.1532 is the value of $\alpha$ in radians when the slider is at one end of the potentiometer, the voltage between the slider and the center tap of $P_1$ is proportional to $$\frac{(r-y)(\frac{1}{2}P_1)\alpha}{(R_{13}+P_1)(0.1532)}$$

This last expression is made equal to $(r-y)\alpha/0.996$ by the proper choice of $P_1$ and $R_{13}$. The difference between the voltage proportional to $x$ and that proportional to $(r-y)\alpha/0.996$ forms the error signal for the servo amplifier and motor 177 which positions the slider on $P_1$ until this difference is zero. The slider on $P_1$ is linked mechanically through a 20-to-1 speed reduction gear 97 to the outer cases of the wind vector and airspeed vector potentiometers.

The equation for $\alpha$ in the Southern Hemisphere is put into the form $$(r-y) \sin \alpha + x \cos \alpha = 0$$

which may be approximated by $$(r-y')\frac{\alpha}{0.996} + x = 0$$

The computer 47 of Fig. 9 can be made to solve this equation by performing the two following operations:

(1) Reverse the connections to potentiometer $P_3$ so as to obtain an output voltage proportional to $-x$ instead of proportional to $x$.
(2) Reverse the connections to potentiometer $P_2$ so as to subtract from the voltage proportional to $r$ a voltage proportional to $y'$ instead of a voltage proportional to $y$.

These operations are performed by the "hemisphere switch" 99 shown on Fig. 6c. When in the Northern Hemisphere, this 4-pole double-throw switch is closed on the contacts marked "N"; when in the Southern Hemisphere, the switch is closed on the contacts marked "S."

*Total distance computer*

The total distance computer 53 continuously determines the total distance and the bearing angle of the aircraft from the point of departure or, if desired, from some other reference point on the sectional map. This computer also forms part of the wind vector computer 179, described below. The total distance and wind vector computers are diagrammed in Fig. 10.

If the point of departure of the aircraft is $(x_0, y_0)$ in Cartesian coordinates, the total straight line distance D from its point of departure to any later position $(x, y)$ is given by $$D = (x-x_0) \cos \beta + (y-y_0) \sin \beta$$

where $\beta$, measured counterclockwise from the $x$-axis, is the angle of bearing of the point $(x, y)$ from the point $(x_0, y_0)$. Angle $\beta$ is defined by the equation $$\tan \beta = \frac{y - y_0}{x - x_0}$$

or $$(y - y_0) \cos \beta = (x - x_0) \sin \beta$$

The above equations are solved continuously for $\beta$ and D by the total distance computer of Fig. 10. The sliders 181 and 183 on the two linear potentiometers $P_6$ and $P_7$, which are arranged to move at the same rate and in the same direction, are displaced from their center positions by the action of the rotation of the $V_{gy}$ driving motor 91 through the $V_{gy}$ differential drive 185. Since at the start of the flight the sliders are matched with the center taps, the displacement of these sliders and hence the voltage applied across the sinusoidally wound potentiometer $P_8$ is directly proportional to $(y - y_0)$, the y-component of the aircraft's displacement from its point of departure. Similarly, the voltage applied across $P_9$ is directly proportional to $(x - x_0)$, the $x$ component of the aircraft's displacement. Maximum permissible displacement of the sliders in either direction from their center positions is arranged to correspond to 1000 nautical miles. This is expected to cover the normal operating radius of a fighter type of aircraft. The dual arrangement of the $x$ and $y$ potentiometers ($P_4$, $P_5$ and $P_6$, $P_7$) is used in order to maintain the center taps of the sinusoidally wound potentiometers $P_8$ and $P_9$ at a constant potential.

The voltage difference between the zero tap and cosine arm of $P_8$ and the zero tap and sine arm of $P_9$ forms the error signal for the $\beta$-amplifier and servo motor unit 187 which positions the arms of these two potentiometers until the equation $(y - y_0) \cos \beta - (x - x_0) \sin \beta = 0$ is satisfied. The voltage proportional to distance is then the sum of the voltage between the zero tap and the minus sine arm of $P_8$ and the voltage between the zero tap and the cosine arm of $P_9$. This voltage is measured by a vacuum tube voltmeter 59 comprising an amplifier and a meter, calibrated to read in nautical miles. An ordinary voltmeter cannot be used in this case as it would load the sinusoidal potentiometers too severely. The vacuum tube voltmeter used is of conventional design and consists of a balanced two-tube circuit employing a large amount of degeneration to achieve stability. A circuit diagram is shown in Fig. 11.

A "total distance reset switch" 101 (see Fig. 6c) is provided for bringing the slider of potentiometers $P_4$, $P_5$, $P_6$ and $P_7$ into coincidence with the mid-points of the potentiometer windings at the start of the flight. To make possible the use of a reference point other than the point of departure, provision is made for displacing the sliders of potentiometers $P_4$ and $P_5$, from the mid-points of the windings by an amount corresponding to the $x$-component of the distance between the point of departure and the reference point. Similarly, the sliders of potentiometers $P_6$ and $P_7$ are displaced from the mid-points of their windings by an amount corresponding to the y-component of the distance between the point of departure and the reference point. The mechanisms for performing these operations are described below.

*Wind vector computer*

It has been explained that, during the course of a flight, the pilot can determine the wind velocity vector from a ground check pattern, consisting of a circuitous flight path starting and finishing at some visible fixed point of the earth's surface. During this wind pattern flight, no wind speed components are applied to the automatic position indicator 49. (The input terminals of potentiometer $P_{15}$ are disconnected from the voltage proportional to the wind speed.) As a result, the starting and finishing point, as represented on the map by the position indicating light spot, will not coincide. The length of a straight line joining these two points represents the wind acting throughout the flight time, and the direction of this straight line represents the direction in which the wind is blowing.

The total distance computer 53 is used to determine the length and direction of the straight line representing the wind vector. In order to use the total distance computer 53 for this purpose and yet not impair its basic function, provision is made for performing the following operations:

(1) At the start of the wind pattern flight, the resistance elements of the potentiometers $P_4$, $P_5$, $P_6$ and $P_7$, Fig. 10, are shifted by rotating the cases until the mid-points of the windings (the points which are at zero potential) coincide exactly with the position of the sliders. This is essentially equivalent to replacing the coordinates of the original point of departure by those of the point of reference being used in the wind flight pattern.

(2) At the end of the flight pattern, the sliders on $P_4$, $P_5$, $P_6$ and $P_7$, which, unless the wind speed is zero, will no longer coincide with the mid-points of the windings, are rotated until coincidence is again achieved.

(3) Immediately after operation 2 is performed, the resistance elements of each of the potentiometers are returned to their original positions.

As a result of these operations, the total distance computer 53 is returned at the end of the wind flight pattern to precisely the same state as at the start of the pattern, so that it resumes its normal operation.

In the set and reset operations, the cases of the two ganged $x$ potentiometers ($P_4$, $P_5$) and their sliders, arranged to move independently, are driven by the reversible $x_0$ set and reversible $x$ motors 103 and 105 respectively. (See Figs. 6a and 6b.) In normal operation, however, the sliders are positioned by the $V_{gx}$ driving motor 91a. To permit these two methods of positioning the sliders to be exercised independently, a differential gear is used, as indicated in Fig. 6b. Identical mechanisms are provided to operate the $y$ pair of potentiometers ($P_6$, $P_7$).

In order to make fully automatic the matching and resetting operations outlined above, the arrangement of cam switches shown in Figs. 12 and 13 is used. This arrangement is employed on both the $x$ and $y$ potentiometer pairs, and the following description of those on the $x$ pair applies equally well to those on the $y$ pair: Three cams, 191, 193 and 195 each actuating a pair of microswitches, are fastened to the potentiometers as shown. The microswitches in each pair are located 180° apart. Two microswitch pairs (J), (K) and (Q), (R) rotate with the cases; the other pair (N), (O) is fixed to the frame 199 of the computer. Pairs (J), (K) and (N), (O) control the $x_0$ set motor 103; pair (Q), (R) controls the $x$ set motor 105. Each pair of microswitches is wired to give reversible control of a motor, as indicated in Fig. 14. A microswitch is closed when riding on the cam lobe 107.

To perform the first of the operations listed above in which the center taps of the potentiometers are moved into coincidence with the sliders, battery power is supplied to switches (J) and (K) (and to their counter parts (J') and (K')) which perform identical operations for the $y$ potentiometers, see Fig. 14. One or the other of these switches is always closed except when exact coincidence exists, between the center taps and the sliders, for which condition both switches are open. When one of the switches is closed, the $x_0$ set motor 103 moves the outer cases (and hence the windings) of the potentiometers in one direction, while if the other switch is closed, the $x_0$ set motor 103 rotates the cases in the other direction. It is apparent, then, that a matching action takes place. Similarly, switches (Q), (R) and (N), (O) (and their counterparts (Q'), (R') and (N'), (O')) produce matching actions which perform, respectively, operations 2 and 3 above. (Switches (Q) and (R) also permit automatic reset of the sliders to their zero positions at the beginning of a flight.)

At the start of the wind flight pattern, the normal rate of displacement of the sliders on potentiometers $P_4$, $P_5$, $P_6$, and $P_7$ by the $V_{gx}$ and $V_{gy}$ driving motors $91a$ and $91$ respectively is increased 36 times by means of electrically-operated two-speed transmissions. (The rate of travel of the indicating light does not change.) In this way a larger output voltage having a smaller percentage error is delivered by the total distance computer 53 at the end of the wind flight pattern. This output voltage, $E_D$ (Fig. 10) is proportional to the product of the wind speed and the time required to complete the wind pattern.

During the wind flight pattern the slider of potentiometer $P_{12}$ is displaced at a constant rate from its zero position by the time input motor 109. The potential between this slider and the upper end of the potentiometer (as shown in Fig. 10 produced by the 42-volt source is compared to the voltage $E_D$ delivered by the total distance computer 53. The difference between these two voltages constitutes an error signal which is applied to the amplifier 96 and servo motor 85 (indicated as a single block 250 in Fig. 10) which controls the sliders on $P_{10}$ and $P_{11}$. The servo motor displaces the sliders on $P_{10}$ and $P_{11}$ until the error signal is zero. When balance is obtained the following relation holds:

$$I_2 R_t = E_D$$

where $I_2$ is the current flowing in $P_{12}$, and $R_t$ is the resistance between the top end and slider of the potentiometer $P_{12}$. Also, by Ohm's law $$E_2 = I_2 R_T$$

where $E_2$ is the voltage between the two sliders on $P_{10}$ and $P_{11}$, and $R_T$ is the combined resistance of $R_{24}$ and $P_{12}$. Combining these equations we get $$E_2 = \frac{E_D R_T}{R_t}$$

in which $E_D$ is proportional to the product of the wind speed and time, $R_t$ is proportional to time, and $R_T$ is a constant. Hence $E_2$ is proportional to the wind speed. $E_2$ is the voltage applied across the wind vector potentiometer and across a voltmeter composed of $R_{23}$ and $M_1$ which serves as the wind speed indicator 69. The resistances in the circuit are so arranged that the maximum value $E_2$ can assume is exactly 150/700 of the maximum voltage across the air speed potentiometer, since the navigator is designed for a maximum wind velocity of 150 knots and a maximum air speed of 700 knots.

The angle $\beta$ delivered by the total distance computer 53 at the end of the wind flight pattern is the angle measured counterclockwise between the positive extension of the $x$ axis on the plotting board and a line pointing in the direction from which the wind is blowing. $\beta - \alpha$ or H, is the angle measured counterclockwise between true east and this line. The center line through the zero tap on the winding of the wind vector potentiometer $P_{15}$ (shown in Figs. 6a and 7) is continually offset by the angle $\alpha$ from a fixed reference line in the computer. H is the wind angle desired in the wind vector potentiometer between this fixed reference direction and the sine arm of the potentiometer. $\beta$ is the angle between the zero tap and sine arm. Therefore, at the start of the wind pattern, the sine arm of the wind vector potentiometer $P_{15}$ is matched up with its zero tap. An electrically-operated clutch is then engaged so that during the pattern flight the sine arm is continuously turned through the angle $\beta$. (But no voltage is applied across $P_{15}$ during the wind pattern flight, so that the positions of the sliders are of no consequence.) Then, at the end of the wind pattern flight, the sine arm makes the angle H with the reference direction in the computer. Actually, the direction *to* which the wind is blowing is desired for resolving components of the wind vector, but merely reversing the polarity of the voltage $\alpha$ impressed on potentiometer $P_{15}$ corrects for this disparity.

Just as the center tap is matched with the slider of the linear potentiometers in the total distance computer 53, so the sine arm of the wind vector potentiometer is matched with its zero tap at the start of the wind flight pattern. Figs. 15 and 16 show an arrangement of self-matching cam-switches to accomplish this for the wind vector potentiometer. The arms and case move independently. The case is always offset to angle $\alpha$ by a shaft rotation proportional to $\alpha$. The microswitches (L) and (M) rotate with the case, and the cam plate 111 rotates with the sliders. Both microswitches are open when the sine arm coincides with the position of the zero tap of the winding. When the microswitches are energized, the particular switch which is closed by its cam will cause the wind direction motor 81 to rotate the arms and cam to the position in which both switches are open.

To give a visual indication of the wind direction, a selsyn transmitter 88 is geared to rotate with the arms of the wind vector potentiometer. A measure of angle H is then obtained which is used to position a pointer on a compass rose 75 to represent the wind direction as shown in Fig. 6c.

*Control system for total distance and wind vector computers*

Details of the control system for the total distance and wind vector computers will now be described. This system is diagrammed in Fig. 14. Numbered circles on this diagram indicate cable connections between the computer unit 30 and the data presentation unit 34, the numbers corresponding to those shown in Figs. 6a, 6b, and 6c.

Referring to Fig. 14, microswitch pairs (J) (K), (Q) (R) and (N) (O) are mounted on the $x$ potentiometers $P_4$ and $P_5$ of the total distance computer 53, as previously explained and shown in Fig. 12. Microswitch pairs (J') (K'), (Q') (R'), and (N') (O') are mounted on the corresponding $y$ potentiometers $P_6$ and $P_7$. Microswitch pair (L) (M) is mounted on the wind vector potentiometer $P_{15}$, as shown in Fig. 15.

As the pilot starts the wind pattern flight, he pushes the wind pattern switch 113 into the "start" position and then releases it. This action energizes the latching relay 115 closing the relay control to the "start" position, and connecting switches (K), (K'), and (M) to the positive terminal of the 24-volt battery of the aircraft. Switches (J), (J') and (L) are connected to the negative terminal of the battery through sequence switch 117. One terminal of the $x_0$ set, $y_0$ set and wind direction motors is connected through sequence switch 119 to the mid tap of the potential divider composed of $R_{47}$ and $R_{48}$, which is connected across the battery. Also, the circuit to the sequence switch motor is completed through sequence switch 121 so that the motor starts. During the first ⅙ revolution of the output shaft of the sequence switch motor leveling actions take place which bring the center taps of the resistance elements of $P_4$, $P_5$, $P_6$ and $P_7$ into coincidence with their sliders and the sine arm of the wind vector potentiometer $P_{15}$ into coincidence with the zero tap. During this time the brake-clutch mechanism 203 shown in Fig. 6a is in the brake position and the gear shift mechanism 205 in the position which produces a 36:1 speed reduction.

When sequence switches 117 and 119 open, sequence switch 123 closes, energizing the timing motor and a relay. The relay disconnects the input to the wind vector potentiometer $P_{15}$, replaces this potentiometer with an equal resistance $R_{49}$ so as to maintain unchanged the loading on potentiometer $P_{10}$ and $P_{11}$, completes the circuit from the total distance computer to the wind servo amplifier, switches the brake-clutch mechanism to the clutch position and the gear shift mechanism from its 36:1 reduction ratio position to its 1:1 position. These conditions remain in effect throughout the wind pattern flight. Although the sequence motor stops after ½ revolution when sequence switch 121 opens, sequence switch 123 remains closed because its cam extends slightly beyond the 180° position.

At the instant the pilot completes the wind pattern flight, he pushes the wind pattern switch into the "end" position and then releases it. This action energizes the latching relay closing the relay contact to the "end" position, and connecting switches (O) and (O') to the positive terminal of the 24-volt battery. The circuit to the sequence switch motor 130 is completed through sequence switch 125 and the motor starts again. Sequence switch 123 then opens, stopping the timing motor 109 and de-energizing the relay. When the relay opens, the input to the wind vector potentiometer is reconnected, the connection between the servo amplifier and total distance computer broken, the brake-clutch mechanism shifted to the brake position, and the gear shift mechanism shifted to its 36:1 position. Sequence switch 127 is then closed connecting one side of the $x$ and $y$ set motors to the mid-tap of the potential divider, and permitting the switches (Q) (R) and (Q') (R') to perform the leveling action which matches the sliders on $P_4$, $P_5$, $P_6$ and $P_7$ with the center taps. Subsequently, sequence switches 119 and 129 close simultaneously and permit (N) (O) and (N') (O') to perform the leveling action which returns the resistance elements of $P_4$, $P_5$, $P_6$, and $P_7$ to their initial positions. The sequence motor stops after ½ revolution of its output shaft has been completed.

During the sequence of operations which take place at the end of the flight pattern, the time reset motor 131 which is energized when the wind pattern switch is thrown to the "end" position returns the slider on $P_{12}$ to its initial position. The time reset motor 131 is stopped when the slider reaches its correct position by the time reset motor limit switch 133 which breaks the connection to the motor. This switch is mounted so as to be actuated when the slider on $P_{12}$ reaches its initial position.

Should the pilot forget to throw the wind pattern switch to the "end" position at the end of the wind pattern flight, the timing motor 109 continues to run. As the slider on $P_{12}$ nears the end of its travel it actuates the time motor limit switch 135. The switch is in parallel with sequence switch 127 so that the leveling actions which match the sliders of $P_4$, $P_5$, $P_6$ and $P_7$ with their center taps takes place. As a consequence of this action the voltage $E_D$ becomes zero and the sliders on $P_{10}$ and $P_{11}$, still controlled by the servo motor, move to their center positions which correspond to zero wind speed. As these sliders reach their center positions they actuate the automatic-end switch 137 which energizes the latching relay and permits the normal sequence of events at the end of the wind pattern to be carried out. Thus the total distance computer is automatically returned to its normal function with only a small error even though the pilot forgets to throw the wind pattern switch. If at some later time he discovers his error, he can calculate roughly the error introduced by operating with zero wind speed, and make allowance for it (assuming that he knows the approximate wind speed and direction).

The "total distance reset switch 101" shown in Fig. 14 brings into operation microswitches (Q) (R) and (Q') (R'). The resulting leveling action brings the sliders of potentiometers $P_4$, $P_5$, $P_6$ and $P_7$ into coincidence with the mid-points of their winding, thus setting the total distance to zero at the start of the flight.

The "total distance $x_0$-set 207" and "$y_0$-set 209" switches provide independent control of the $x$ and $y$ set motors 105 and 106, permitting the pilot to set into the total distance computer the coordinates of a reference point (other than the point of departure) from which he desires to measure total distance. The expected procedure is that the pilot will be given before take-off the $x$ coordinate distance in nautical miles and the bearing angle of the reference point from the point of departure. (Alternatively, he could determine these quantities himself by marking on the map his point of departure and the reference point and using a scale and protractor.) Then, after having first brought the total distance reading to zero with the total distance reset switch 101, the pilot operates the $x$ set motor 105 (by means of the $x_0$ set switch 207) until the total distance indicator reads the $x$ coordinate of the reference point from the point of departure. He then operates the $y$ set motor 106 until the $\beta$-indicator 61 reads the bearing angle of the reference point from the point of departure.

Error signal amplifiers

Of the six servo amplifiers required by the automatic navigator, five are identical in construction. These are D.C. chopper-type amplifiers employing D.C. synchronous type split-reed vibrators 211 and 213. The vibrators serve the double purpose of converting the D.C. input signal to A.C. and rectifying the output to provide a D.C. current for the permanent magnet direct current motor 89 which serves as the servo motor.

A circuit diagram of one of these five amplifiers is shown in Fig. 17. The D.C. input signal is converted by one of the vibrating contactors 213 into a square wave having a frequency or repetition rate equal to the resonant frequency of the vibrating reed (about 100 c.p.s.). The square wave is amplified by the conventional A.C. amplifier consisting of two voltage amplifier pentodes 215 and 217 and a beam power output tube 219. The output of the power tube 219 is rectified by a second vibrating contactor 211 to obtain a D.C. current for the motor. The two vibrating contactors of the vibrator unit are insulated electrically from each other but are mounted on the same reed so that they make and break their respective circuits at precisely the same instant. Because of this feature the current through the motor has exactly the same sense as the D.C. input signal, being in one direction for a positive input signal and in the other direction for a negative input signal. The D.C. motor thus reverses its direction when the sense of the input signal changes.

The two resistors $R_{36}$ and $R_{37}$ and the capacitor $C_8$ at the input signal stage form an anti-hunt network.

The beam power amplifier output tube 219, operating Class A, delivers approximately 2 watts of power with a peak signal input of 9 volts. The gain of the preceding stages and the input transformer 221 insure that full output power will be delivered to the servo motor with an input signal of the order of 1 millivolt. Since the motor delivers torque required for its adjustment function with an input of only one-half watt, the amplifier gain is sufficient to take care of any losses that may occur in the vibrator unit, the output transformer 223, and the anti-hunt circuit in the input.

Each amplifier requires a B supply of 200 volts at about 33 milliamperes. A single rectifier power unit (see Fig. 18) supplies all of the five amplifiers with this B voltage. The filaments of the tubes are supplied from the 24-volt battery and are connected as indicated in Fig. 18.

The additional servo amplifier required by the navigator, which is of the A.C. type, is used to position the sliders of the true airspeed vector potentiometer to correspond with the aircraft heading information received from the gyrosyn compass. This is a conventional RC coupled amplifier, the output of which supplies power to one winding of a two-phase motor.

Computer power supply unit

For satisfactory operation of the several computer systems, it is necessary that certain of the constant voltage sources be isolated from each other. This is true because it is not in general possible to connect the corresponding terminals of impedance elements in two circuits, even though the potential differences are equal, without disturbing the currents in both networks. For such interconnection to be possible without current changes, either the two networks must be supplied from isolated sources or one point of each network must be maintained at the same potential with respect to the source potential. The second of these alternatives has been used in several instances in the navigator design where a dual potentiometer arrangement is used to keep corresponding points in the two networks at the same potential. In this manner the number of independent constant voltage sources required has been reduced to two. These are obtained by rectifying and filtering the voltages from two separate windings on a power transformer.

To stabilize the D.C. voltages against changes in the input voltage, a line voltage stabilizer is connected between the supply voltage and the primary of the power transformer. No stabilization against changes in load are required, since the system operates essentially on constant load.

A circuit diagram of the power supply unit for the automatic navigator is shown in Fig. 18. In all, five independent D.C. sources are required. One of these consists of the 28-volt storage battery; the others are derived from the 110-volt, 400 c.p.s., A.C. supply 140 through the process of rectification and filtering. The two stabilized voltage sources required by the various computers (one of 21 volts and the other of 42 volts) are made essentially independent of line variations by means of an iron filament automatic ballast-regulating tube 139. In order to obtain adequate regulation (approximately ±0.5% for ±10% variation in primary voltage) an argon lamp is connected across the input. Since these two stabilized sources operate into an essentially constant resistive load, no stabilization against load changes is required.

The two other D.C. sources required, that for the servo amplifier B supply and that for the vacuum tube voltmeter which serves as the total distance indicator, are supplied by a separate transformer (using a single transformer for all four sources would increase the complexity and size of the regulator unit). Conventional rectifier and filter circuits are used for these sources.

The 24-volt battery supplies the filament current for the vacuum tubes, the indicator and warning lights, and furnishes the power required to drive the vibrator units and all motors with the exception of the servo motors.

DATA PRESENTATION EQUIPMENT DESIGN

The functions performed by the data presentation equipment and the general arrangement of this unit were explained above. The design of the unit will now be described, with particular reference to Figs. 5 and 6c.

Movement of the position indicator light 145 of the indicator 49 is controlled by means of two cable systems, which move the light in the horizontal and vertical directions by amounts proportional to the rotation of the $x$ capstan 147 and $y$ capstan 93 respectively. To avoid errors due to the cable slipping or creeping on the capstan, the cable drums are grooved and the number of turns around the drum is sufficient to permit the center of the cable to be attached to the drum. The capstans themselves are driven from the computer unit by means of flexible shafts 225 and 227 and worm reduction gears at the capstans. Reset or readjustment of the position of the indicator light is accomplished by means of two adjusting wheels 151 and 153 which project slightly through the front edge of the board. These wheels actuate differential mechanisms located inside the capstan cable drums and add to or subtract from the motions imparted by the worm drives.

Each sectional map 155 is reproduced on transparent material and sandwiched between two transparent plastic sheets 157 and 159. Positions can be marked and, if desired, courses can be plotted manually on the top surface with a china marking pencil. The lower surface of sheet 159 is ground and will appear white from above. The indicating light 145 will form a small spot on this surface. It is recommended that the lower plastic sheet be made as thin as possible and that the map be reproduced on the lower surface of the middle sheet. There will then be no appreciable error due to optical parallax. Coded tabs 51 (different for each map) protrude from the upper margin of the sandwich and will automatically actuate selected switches 161 when the map sandwich is inserted in the data presentation equipment.

The desired accuracy is easily realized by using grooved capstan drums, preloaded cable having a temperature coefficient of expansion approximately the same as the frame of the assembly, and ball bearing pulleys throughout. Large speed reduction ratios between the flexible shafts and the capstans allow a generous tolerance for angular error in the flexible shaft drives.

An $x$ potentiometer 163 is driven from capstan 147 and a $y$ potentiometer 165 is driven from capstan 93, each by gearing designed so that each potentiometer arm makes one revolution during the extreme travel of the indicator. These are the $x$ and $y$ potentiometers of the $\alpha$-computer 47. The switches 161 at the rear of the unit, actuated by the coded tabs 51 on the map 155, are also part of the $\alpha$-computer 47, with the exception of one switch (not shown) which sets the rate of indicator travel to suit the scale of the map.

The position indicating light source 145 is a small flashlight type lamp with the lens blown into the glass envelope. A cylinder 231 surrounds the lamp and extends beyond the lens to within approximately 1/32" of the under side of the map sandwich. Cross hairs fixed on the upper end of the cylinder cast a well defined shadow on the map. The intersection of these two shadow lines within the light spot circle provide an accurate position indication. The electrical connections to the light are made through a pair of insulated wires wound on a spring-loaded reel mounted on the frame of the data presentation unit. Said wires and reel are not shown.

In order to produce a permanent trace of the aircraft's course, a small pen can be installed with its point exactly at the cross hair intersection. The pen will consist of a small tube extending from the cross hair intersection down to the lamp lens. Here the tube will make a 90° bend and pass through the cylinder wall into an ink reservoir. The bent portion of the pen will be positioned so that its shadow will coincide with the shadow cast by one of the cross hairs. As the carrier moves, an ink line will be drawn on the ground lower surface of the map sandwich, providing a permanent trace of the aircraft's course over the ground. This ink line, as well as the light spot, will be visible through the map sandwich.

The procedure to be followed when maps are changed is to mark the position which has been reached on the new map, insert the new map and manually reset the point of light to the marked position. The operation of the total distance computer is uninterrupted. When changing from a Type I to a Type II map, or vice versa, tab-actuated switches 161 automatically change the driving rate of the indicator to correspond to the scale change, by remotely actuating a two-speed transmission in the computer. (See Figs. 6a, 6b and 6c.)

The data presentation unit 34 is provided with a warning system to inform the pilot when the position indicator 49 is nearing the map edge. Since the shaft motions of the $x$ and $y$ potentiometers 163 and 165 are direct measures of the position indicator's distances from the map borders, these potentiometers are utilized in the warning system. Cams designed to actuate microswitches 233 and 235 when the point of light is within one inch of the map edge, are mounted on the shaft of each one of these potentiometers. Closing the microswitch energizes a red jewel light 167 mounted on the front edge of the data presentation unit. This warning light is visible to the pilot whether the unit is pulled out from or slid into the instrument panel. Consequently, the system gives ample warning when the data presentation unit is in any position.

As shown in Fig. 5, underlighting of the map is provided by small lamps 169 the light from which is reflected from the inside surface of the metal sheet forming the bottom of the data presentation equipment case. Reflectors 237 are placed over these lamps to avoid bright spots on the map. A diffused indirect lighting of the ground lower surface of the map sandwich is thus provided, avoiding shadows from the mechanism. A rheostat 171 is provided for dimming these lights to avoid interference with night vision.

Obviously many modifications and variations of the present invention are possible in the light of the above teachings. It is therefore to be understood that within the scope of the appended claims the invention may be practiced otherwise than as specifically described.

I claim:

1. An automatic aircraft navigator comprising an airspeed component computer, a true airspeed indicator connected to said airspeed computer, a compass connected to said computer, a second computer to determine the angle $\alpha$ to correct for the error introduced by plotting in rectangular coordinates on a Lambert type map, said second computer being connected to said airspeed computer, a wind speed component computer connected to receive the output of said second computer, means to insert wind speed and wind angle factors into said wind speed component computer, an integrator generating the time integral of the X component from the outputs of said airspeed computer and said wind speed component component computer, a second integrator generating the time integral of the Y component from said outputs, and position indicator means actuated by the outputs of said integrators to indicate the position of the aircraft relative to said map.

2. An automatic aircraft navigator adapted to show an instantaneous indication of aircraft position upon a Lambert type map representation of the earth's surface comprising an airspeed component computer, a true airspeed indicator connected electrically to said airspeed computer, a gyrosyn type compass connected mechanically to said computer, a second computer to determine the angle $\alpha$ to correct for the error introduced by plotting in rectangular coordinates upon such map, said second computer being coupled to said airspeed computer, a wind speed component computer coupled to receive the output of said second computer, means to insert wind speed and wind angle factors into said wind speed component computer, an integrator coupled to said airspeed computer and said wind speed component computer to generate the time integral of the $x$ components of their outputs, a second integrator coupled to said airspeed computer and said wind speed component computer to generate the corrected $y$ component, and a position indicator coupled to said integrators to indicate the position of the aircraft on such map.

3. In an automatic aircraft navigator having a compass, a plurality of means to generate voltages proportional to true air speed and wind speed, $V_{gx}$ and $V_{gy}$ tachometer generators, a remote torque control system driven by such compass, a wind vector computer and an $\alpha$ correction computer, an aircraft position computer comprising a first casing, a first sinusoidally wound potentiometer secured in said first casing, a second casing, a second sinusoidally wound potentiometer secured in said second casing, each of said potentiometers having a plurality of sliders, means to deliver such air speed voltage to the windings of said first potentiometer, means to deliver such wind speed voltage to the windings of said second potentiometer, means coupling such remote torque control system and the sliders of said first potentiometer, means coupling said wind vector computer to the sliders of said second potentiometer, mechanical means coupling the output of such $\alpha$ correction computer to said first and said second casings, means to add the voltages derived from said potentiometers and balance the same against the outputs of each of such generators, a first servo motor controlled by said $V_{gy}$ unbalance error signal, a $V_{gy}$ driving motor geared to said tachometer generator and controlled by said first servo motor, a first two phase main driving motor having the magnitude and phase of voltage applied to one winding controlled through sliders on third and fourth potentiometers, said sliders being positioned by the output of said first servo motor, a second servo motor controlled by said $V_{gx}$ unbalance error signal, a $V_{gx}$ driving motor geared to said tachometer generator and controlled by said second servo motor, a second two-phase main driving motor having the magnitude and phase of voltage applied to one winding controlled through sliders on fifth and sixth potentiometers, said sliders being positioned by the output of said second servo motor.

4. In an automatic aircraft navigator having a Lambert type map, a position indicator adapted to move horizontally and vertically relative the surface of such map, an $x$ capstan and a $y$ capstan to move said indicator, and wind vector and air speed vector potentiometers, an $\alpha$ computer to solve the northern hemisphere equation $$(r-y)\frac{\alpha}{0.996} - X = 0$$

where $r$ equals the radius of the base parallel of latitude tangent to the edge of such map nearest the equator, $y$ equals vertical travel in inches measured upward from the lower edge of the map, $x$ equals horizontal travel in inches from the central meridian, and $\alpha$ equals a map distortion characteristic factor expressed in radians, said computer comprising a first linear potentiometer having a first slider rotated by such $x$ capstan to provide a voltage proportional to $x$, a second linear potentiometer having a second slider, a potential divider comprising a plurality of fixed resistors, said second slider being rotated by such $y$ capstan, a plurality of switches, a plurality of coded tabs on such map to actuate selected switches and provide a derived voltage proportional to $(r-y)$ between said second slider and a tap on said potential divider, a fixed resistor, a third linear potentiometer having a third slider, said derived voltage being applied across said fixed resistor and said third potentiometer, the difference between said voltage proportional to $x$ and said derived voltage providing an error signal, a servo amplifier and motor driven by said error signal and linked to said third slider to null said error signal, said third slider being coupled through speed reduction gearing to the outer cases of such wind vector and airspeed vector potentiometers.

5. The combination of claim 4 in which the first potentiometer and the second potentiometer include means to reverse connections thereto, whereby the equation for $\alpha$ in the southern hemisphere can be applied.

References Cited in the file of this patent

UNITED STATES PATENTS

| | | |
|---|---|---|
| 2,406,836 | Holden | Sept. 3, 1946 |
| 2,425,346 | Rippere | Aug. 12, 1947 |
| 2,475,314 | Dehmel | July 5, 1949 |
| 2,502,991 | Rast et al. | Apr. 4, 1950 |
| 2,541,277 | Omberg et al. | Feb. 13, 1951 |
| 2,560,527 | Dehmel | July 10, 1951 |
| 2,588,763 | Reilly | Mar. 11, 1952 |
| 2,796,681 | Ringham | June 25, 1957 |

FOREIGN PATENTS

| | | |
|---|---|---|
| 1,066,312 | France | June 3, 1954 |

OTHER REFERENCES

"Servomechanism Practice" (Ahrendt), published by McGraw-Hill, 1954 (page 100 relied on).